(12) United States Patent
Qu et al.

(10) Patent No.: US 10,616,626 B2
(45) Date of Patent: Apr. 7, 2020

(54) METHOD AND SYSTEM FOR ANALYZING USER ACTIVITIES RELATED TO A VIDEO

(71) Applicant: The Hong Kong University of Science and Technology, Hong Kong (CN)

(72) Inventors: Huamin Qu, Hong Kong (CN); Conglei Shi, New York, NY (US); Siwei Fu, Hong Kong (CN); Qing Chen, Hong Kong (CN)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 0 days.

(21) Appl. No.: 15/062,259

(22) Filed: Mar. 7, 2016

(65) Prior Publication Data
US 2016/0295260 A1    Oct. 6, 2016

Related U.S. Application Data

(60) Provisional application No. 62/178,040, filed on Mar. 31, 2015.

(51) Int. Cl.
*H04N 7/16* (2011.01)
*H04N 21/25* (2011.01)
(Continued)

(52) U.S. Cl.
CPC ....... *H04N 21/252* (2013.01); *H04N 21/2387* (2013.01); *H04N 21/25866* (2013.01);
(Continued)

(58) Field of Classification Search
CPC ............ H04N 21/252; H04N 21/2387; H04N 21/25866; H04N 21/4532; H04N 21/6587
(Continued)

(56) References Cited

U.S. PATENT DOCUMENTS

| | | | |
|---|---|---|---|
| 6,931,198 B1 * | 8/2005 | Hamada | H04N 5/765 348/E7.061 |
| 6,982,708 B1 | 1/2006 | Mah et al. | |

(Continued)

OTHER PUBLICATIONS

C. Romero and S. Ventura, Educational Data Mining: A Review of the State of the Art. IEEE Transactions on Systems, Man, and Cybernetics, Part C (Applications and Reviews), 40(6):601-618, Nov. 2010.

(Continued)

*Primary Examiner* — Jivka A Rabovianski
(74) *Attorney, Agent, or Firm* — Pillsbury Winthrop Shaw Pittman LLP

(57) ABSTRACT

The present teaching relates to analyzing user activities related to a video. The video is provided to a plurality of users. The plurality of users is monitored to detect one or more types of user activities performed in time with respect to different portions of the video. One or more visual representations of the monitored one or more types of user activities are generated. The one or more visual representations capture a level of attention paid by the plurality of users to the different portions of the video at any time instance. Interests of at least some of the plurality of users are determined with respect to the different portions of the video based on the one or more visual representations.

31 Claims, 23 Drawing Sheets

(51) Int. Cl.
*H04N 21/258* (2011.01)
*H04N 21/45* (2011.01)
*H04N 21/2387* (2011.01)
*H04N 21/6587* (2011.01)
*H04N 21/466* (2011.01)

(52) U.S. Cl.
CPC ... *H04N 21/25883* (2013.01); *H04N 21/4532* (2013.01); *H04N 21/6587* (2013.01); *H04N 21/4667* (2013.01)

(58) Field of Classification Search
USPC .............................. 725/12, 31, 43, 14, 32, 46
See application file for complete search history.

(56) References Cited

U.S. PATENT DOCUMENTS

| | | | | |
|---|---|---|---|---|
| 7,266,510 | B1* | 9/2007 | Cofino | G06Q 30/02 705/26.1 |
| 8,566,315 | B1* | 10/2013 | Davtchev | G06F 16/78 707/736 |
| 8,714,981 | B2 | 5/2014 | Herman et al. | |
| 2006/0143665 | A1* | 6/2006 | Meek | H04N 7/17336 725/88 |
| 2013/0077940 | A1* | 3/2013 | Shackleton | H04N 5/91 386/249 |
| 2014/0101580 | A1 | 4/2014 | Shen et al. | |
| 2015/0229975 | A1* | 8/2015 | Shaw | H04N 21/23439 725/10 |

OTHER PUBLICATIONS

E. N. Ogor. Student Academic Performance Monitoring and Evaluation Using Data Mining Techniques. In Electronics, Robotics and Automotive Mechanics Conference (CERMA 2007), pp. 354-359. IEEE, Sep. 2007.

R. Mazza and V. Dimitrova. CourseVis: A graphical student monitoring tool for supporting instructors in web-based distance courses. International Journal of Human-Computer Studies, 65(2):125-139, Feb. 2007.

P. J. Guo, J. Kim, and R. Rubin. How video production affects student engagement: an Empirical study of MOOC video. Proceedings of the first ACM conference on Learning @ scale conference, pp. 41-50, New York, New York, USA, 2014. ACM Press.

K. Chorianopoulos. Collective intelligence within web video. Humancentric Computing and Information Sciences, 3 (1):10, 2013.

J. Van Wijk and E. Van Selow. Cluster and calendar based visualization of time series data. In Proceedings 1999 IEEE Symposium on Information Visualization (InfoVis'99), pp. 4-9,. IEEE Comput. Soc, 1999.

Z. Shen, J. Wei, N. Sundaresan, and K.-L. Ma. Visual analysis of massive web session data. IEEE Symposium on Large Data Analysis and Visualization (LDAV), pp. 65-72, Oct. 2012.

J. Wei, Z. Shen, N. Sundaresan, and K.-L. Ma. Visual cluster exploration of web clickstream data. 2012 IEEE Conference on Visual Analytics Science and Technology (VAST), pp. 3-12, Oct. 2012.

R. Shaw and M. Davis. Toward emergent representations for video. Proceedings of the 13th annual ACM international conference on Multimedia—Multimedia '05, p. 431, 2005.

* cited by examiner

METHOD AND SYSTEM FOR ANALYZING USER ACTIVITIES RELATED TO A VIDEO

CROSS REFERENCE TO RELATED APPLICATION

The present application claims the benefit of U.S. Application No. 62/178040 filed Mar. 31, 2015, which is incorporated herein by reference in its entirety.

BACKGROUND

1. Technical Field

The present teaching generally relates to multimedia technology. More specifically, the present teaching is directed to methods, systems, and programming for analyzing user activities related to a video.

2. Discussion of Technical Background

As people increasingly consume content online, more and more users like to communicate online, watch video online, and take courses online. An online course has become a popular alternative to the traditional on-site education, as an online course can offer students more flexibility. For example, students may take an online course that posts weekly video lectures and assignments online. Students may watch the video lectures and work on the assignments throughout the week at their own pace.

An educational analyst or a course instructor may be interested in how students react to the video lectures of the course. The e-learning behaviors of students can be better analyzed with a system having a visualization tool for visualizing student access and activity patterns and student performance. Existing works on user behavior visualization focus on user browsing behavior, online shopping click sequence, or merely basic user activities with respect to an online video like play and pause. The existing systems do not allow the educational analyst or the course instructor to interact with a visual representation of the user activities or to analyze different portions of the video lecture based on the visual representation. In addition, existing visualization tools merely explore user activities in a single scale or from a single perspective.

Therefore, there is a need to provide an improved solution for analyzing user activities with respect to a video to solve the above-mentioned problems.

SUMMARY

The teachings disclosed herein relate to multimedia technology. More specifically, the present teaching is directed to methods, systems, and programming for analyzing user activities related to a video.

In one example, a method, implemented on a machine having at least one processor, storage, and a communication platform capable of connecting to a network for analyzing user activities is disclosed. A video is provided to a plurality of users. The plurality of users is monitored to detect one or more types of user activities performed in time with respect to different portions of the video. One or more visual representations of the monitored one or more types of user activities are generated. The one or more visual representations capture a level of attention paid by the plurality of users to the different portions of the video at any time instance. Interests of at least some of the plurality of users are determined with respect to the different portions of the video based on the one or more visual representations.

In a different example, a system having at least one processor, storage, and a communication platform capable of connecting to a network for analyzing user activities is disclosed. The system comprises: a video generator configured for providing a video to a plurality of users; a video watching activity monitor configured for monitoring the plurality of users to detect one or more types of user activities performed in time with respect to different portions of the video; an activity-based graph generator configured for generating one or more visual representations of the monitored one or more types of user activities, wherein the one or more visual representations capture a level of attention paid by the plurality of users to the different portions of the video at any time instance; and a user interest analyzer configured for determining interests of at least some of the plurality of users with respect to the different portions of the video based on the one or more visual representations.

Other concepts relate to software for implementing the present teaching on analyzing user activities. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for analyzing user activities is disclosed. The information, when read by the machine, causes the machine to perform the following: providing a video to a plurality of users; monitoring the plurality of users to detect one or more types of user activities performed in time with respect to different portions of the video; generating one or more visual representations of the monitored one or more types of user activities, wherein the one or more visual representations capture a level of attention paid by the plurality of users to the different portions of the video at any time instance; and determining interests of at least some of the plurality of users with respect to the different portions of the video based on the one or more visual representations.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
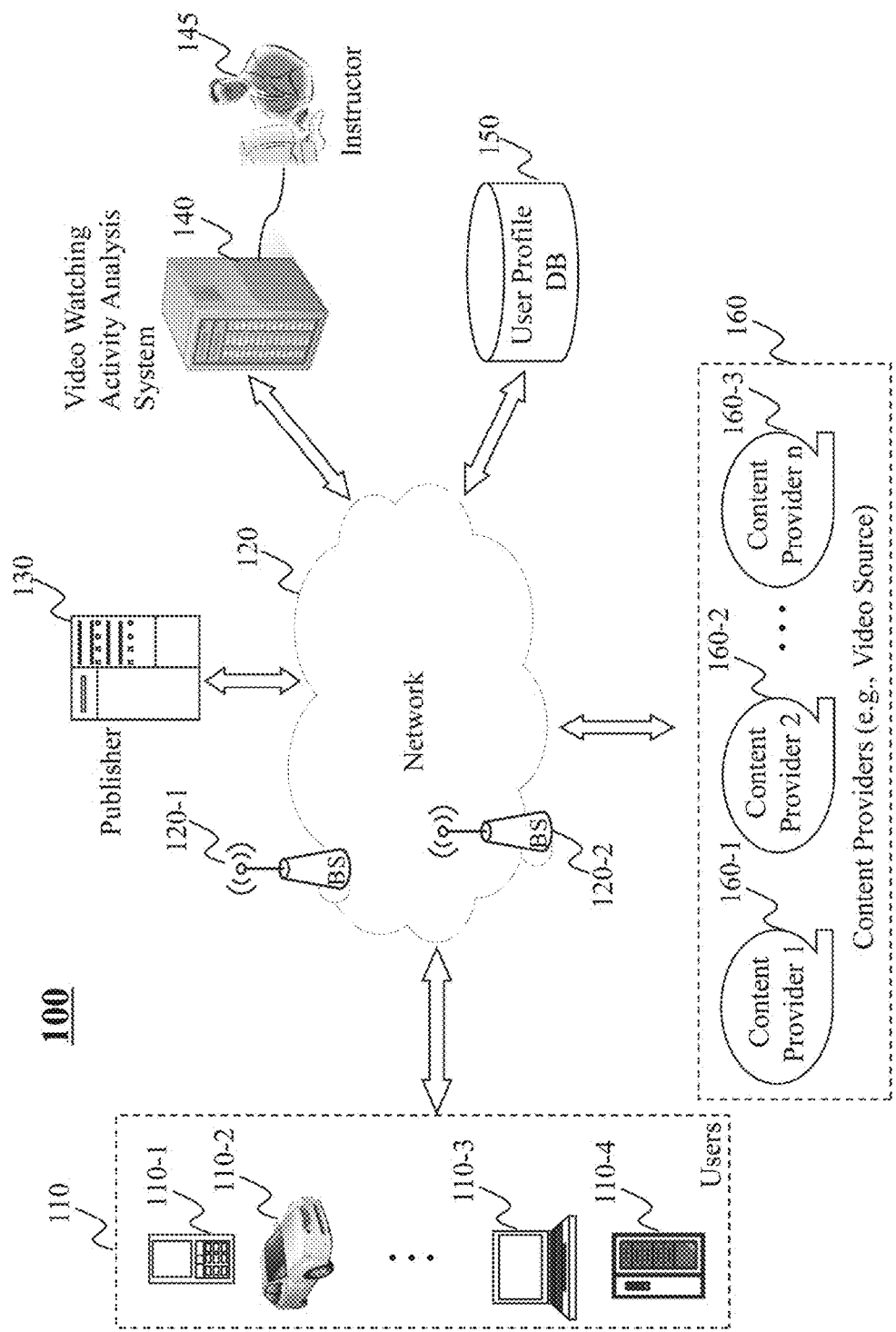
FIG. 1 is a high level depiction of an exemplary network environment for analyzing video watching activity, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching describes method, system, and programming aspects of analyzing user activities related to a video, e.g. an online video lecture. The system may monitor user activities to obtain different types of clickstream data, e.g. play, pause, seek, stalled, error, and rate-change. The system and method of the present teaching can provide an insightful analysis of student study behaviors in watching video lectures or a general analysis of any video watching behaviors. The system may provide an event graph to show different kinds of clickstream events (e.g., play, stop, seek, and rate-change) together with a seek graph which shows an insightful analysis of the student online study behaviors with large-scale data. These two graphs combined with video contents can help instructors and education experts to locate the course content measured in per second unit and determine which segments of the lecture video are of particular importance, e.g. more interesting to the students, less interesting to the students, difficult to understand for the students, more attention paid by the students, etc.

In some embodiments of the present teaching, the system and method disclosed herein can integrate multi-explorations of statistical analysis such as the course information, geographic distribution, video temporal information, video popularity, and animation. These functions may help with a deep analysis of user activities and provide the instructors with different angles and macro-scale understanding about their students.

In some embodiments of the present teaching, the system and method disclosed herein can help course instructors and education analysts to gain insights into online learning behaviors from macro-scale data. The system may process the enormous video clickstream data from web log data by a platform and generates a session's visualization analysis based on the video content. A user interface may be provided for the instructors or analysts to interact with the data. The user interface may include three main views: the list view to show an overview of the clickstream differences among course videos; the content-based view to show how each type of click action changes along the video timeline, which enables the most viewed sections to be observed and the most interesting patterns to be discovered; and the dashboard view to show various statistical information such as demographic information and temporal information. It can be understood that the system may be applied for analyzing the course video or applied to a general analysis of other video watching behaviors.

In some embodiments of the present teaching, a content-based view disclosed herein may include an event graph to keep track of different types of student interactions. For example, various "click" actions (e.g. "play", "pause", "seek") were tracked while a user watches a video lecture to study. In one embodiment, the system well analyzes and visualizes six types of clickstreams data (play, pause, seek, stalled, error, and rate-change) in an event graph.

In some embodiments of the present teaching, a content-based view disclosed herein may also include a seek graph for visualizing the seek actions of the users. In one embodiment, the seek graph has a parallel coordinate design, where the seek graph includes two parallel axes to encode the starting position and the ending position of each seek event, and a line drawn between the two axes to connect the starting and ending positions together for each seek event.

Advanced data processing technology may be applied to the system of the present teaching, which allows the instructors to take initiative to choose some parameters to filter the data such as the country option and make the real time analysis possible.

In some embodiments of the present teaching, an application of the present teaching could be either system software or a function such as a seek graph, data statistic information or temporal information for analyzing data of an online course, e.g. a massive open online course (MOOC). A MOOC is an online course aimed at unlimited participation and open access via the web. In addition to traditional course materials such as filmed lectures, readings, and problem sets, many MOOCs provide interactive user forums to support community interactions among students, professors, and teaching assistants. MOOC instructors who produce MOOC courses and educational analysts could use the system of the present teaching to study and understand the student online learning behavior.

According to an embodiment, the system of the present teaching may be called VisMOOC and could be extended to other video watching behaviors. VisMOOC is the first system that could handle the scale of MOOCs. Furthermore, VisMOOC can not only allow changes to student data to be made from the graphics, which is a big breakthrough in e-learning research, but also utilize a MapReduce platform to make the analyzing process interactively.

The terms "user behavior" and "user activity" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary network environment 100 for analyzing video watching activity, according to an embodiment of the present teaching. In FIG. 1, the exemplary networked environment 100 includes one or more users 110, a network 120, a publisher 130, a video watching activity analysis system 140, an instructor 145, a user profile database 150, and content providers 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the publisher 130 and the video watching activity analysis system 140 through wired or wireless technologies and related operating systems implemented within user-wearable devices (e.g., glasses, wrist watch, etc.). A user, e.g., the user 110-1, may watch a video published by the publisher 130 and perform various activities with respect to the video, like play, pause, seek, etc., via the network 120. Data about the various activities may be collected and analyzed by the video watching activity analysis system 140.

The publisher 130 may be any entity that hosts one or more spaces in its assets (e.g., web sites, applications, television channels, etc.) for presenting content items, e.g., videos, to viewers. For example, a video lecture generated by the video watching activity analysis system 140 may be provided by the publisher 130 for downloading or streaming by viewers on their computers or mobile devices. The publisher 130 may also be a search engine, a blogger, a television station, a newspaper issuer, a web page host, a content portal, an online service provider, or a game server. For example, video lectures created by the video watching activity analysis system 140 may be broadcasted by a television station.

The content providers 160 include multiple content providers 160-1, 160-2, . . . , 160-3, such as video sources from which original video content can be obtained by the video watching activity analysis system 140 for generating a video lecture. A video source in this embodiment may be any data source that stores compressed or non-compressed video files in any suitable format, such as but not limited to, AVI, QuickTime, Flash Video, RealMedia, MPEG, etc. A content provider 160 may also correspond to a content source, including any web site hosted by an entity, whether an individual, a business, or an organization such as USPTO.gov, cnn.com and Yahoo.com, or a content feed source. In addition to providing video content to the video watching activity analysis system 140, the content providers 160 may also provide content items to the publisher 130 so that they can be presented to the viewers with the videos.

The instructor 145 may be an online course instructor and/or an educational analyst that can instruct the video watching activity analysis system 140 for analyzing user activities about watching an online video, e.g. an online video lecture. In one embodiment, the instructor 145 may instruct the video watching activity analysis system 140 to analyze activities of a particular group of users based on their user profiles in the user profile database 150.

In this example, the video watching activity analysis system 140 may provide a video to be published by the publisher 130 to the users 110 and monitor video watching activities of the users 110. The video watching activity analysis system 140 can detect and collect different types of user activities like play, stop, pause, seek, etc. for analysis. Based on a request or an instruction from the instructor 145, the video watching activity analysis system 140 may filter the collected data and generate one or more visual representations of the user activities, e.g. an event graph showing different kinds of user activities or clickstream events, and a seek graph showing seek events of the users 110 along a timeline of the video. Based on these graphs, the video watching activity analysis system 140 may determine interests of the users 110 or some of the users 110 with respect to the video. In one embodiment, the video is an online lecture that includes different portions. The video watching activity analysis system 140 can determine user interests with respect to the different portions and/or detect which of the different portions is of particular importance. For example, a portion may be of particular importance because it is more interesting to the students, less interesting to the students, difficult to understand for the students, or paid more attention by the students. The video watching activity analysis system 140 can provide the analysis result to the instructor 145 or to whom it may concern.

The instructor 145 may modify the video lecture based on the analysis result, e.g. by uploading a newer version of the video lecture to the content providers 160, or to the video watching activity analysis system 140 directly. For example, the instructor 145 may expand a portion that is determined by the video watching activity analysis system 140 to be difficult to understand for the students; simplify a portion that is determined by the video watching activity analysis system 140 to be not interesting to the students, etc. With these modifications, the video lecture will become more interesting and effective to the students, which can improve quality of the online education or in general all kinds of video broadcasting techniques.

Figure 2:
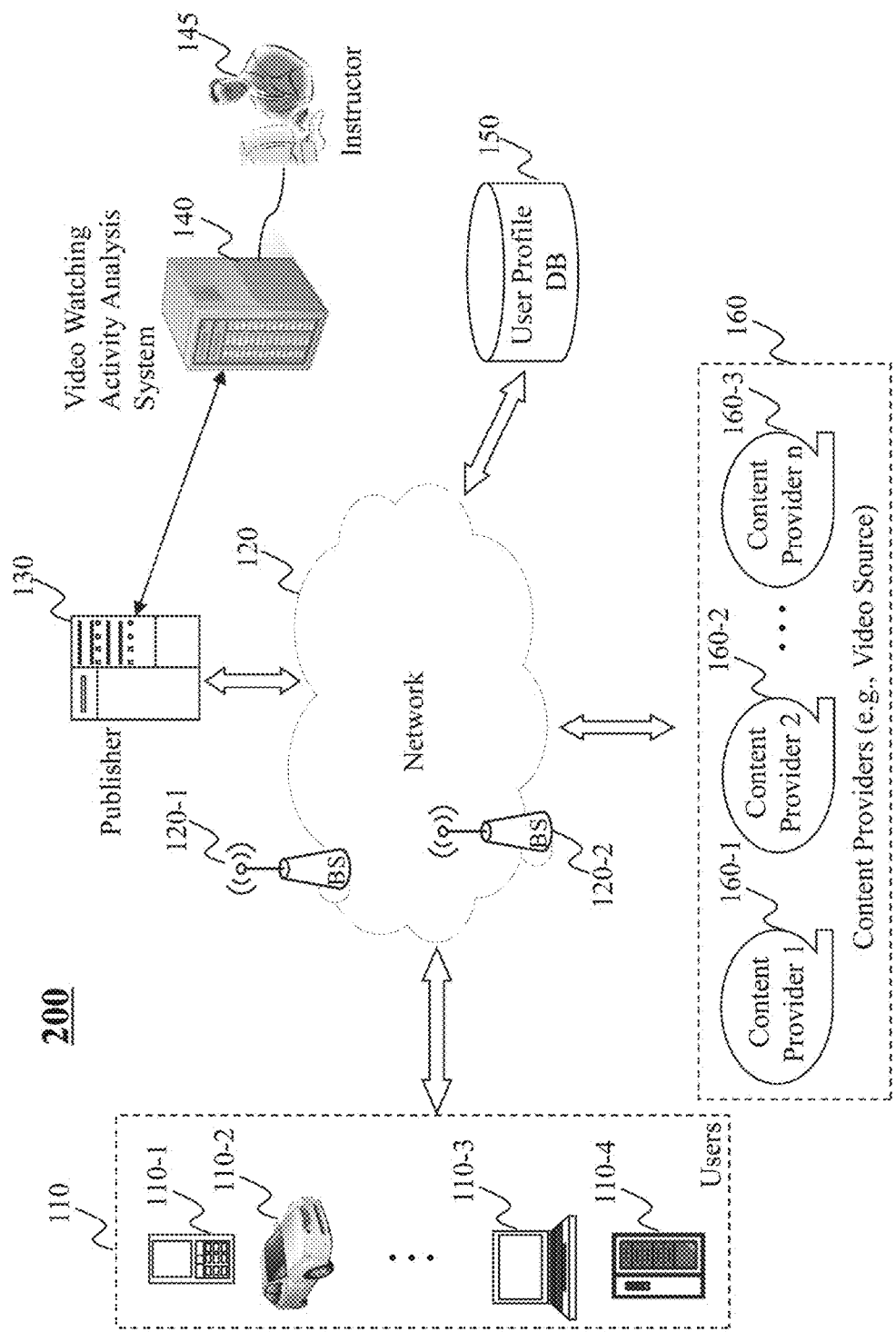
FIG. 2 is a high level depiction of another exemplary network environment for analyzing video watching activity, according to an embodiment of the present teaching.

FIG. 2 is a high level depiction of another exemplary network environment 200 for analyzing video watching activity, according to an embodiment of the present teaching. The exemplary networked environment 200 in this embodiment is similar to the exemplary networked environment 100 in FIG. 1, except that the video watching activity analysis system 140 serves as a backend system for the publisher 130.

Figure 3:
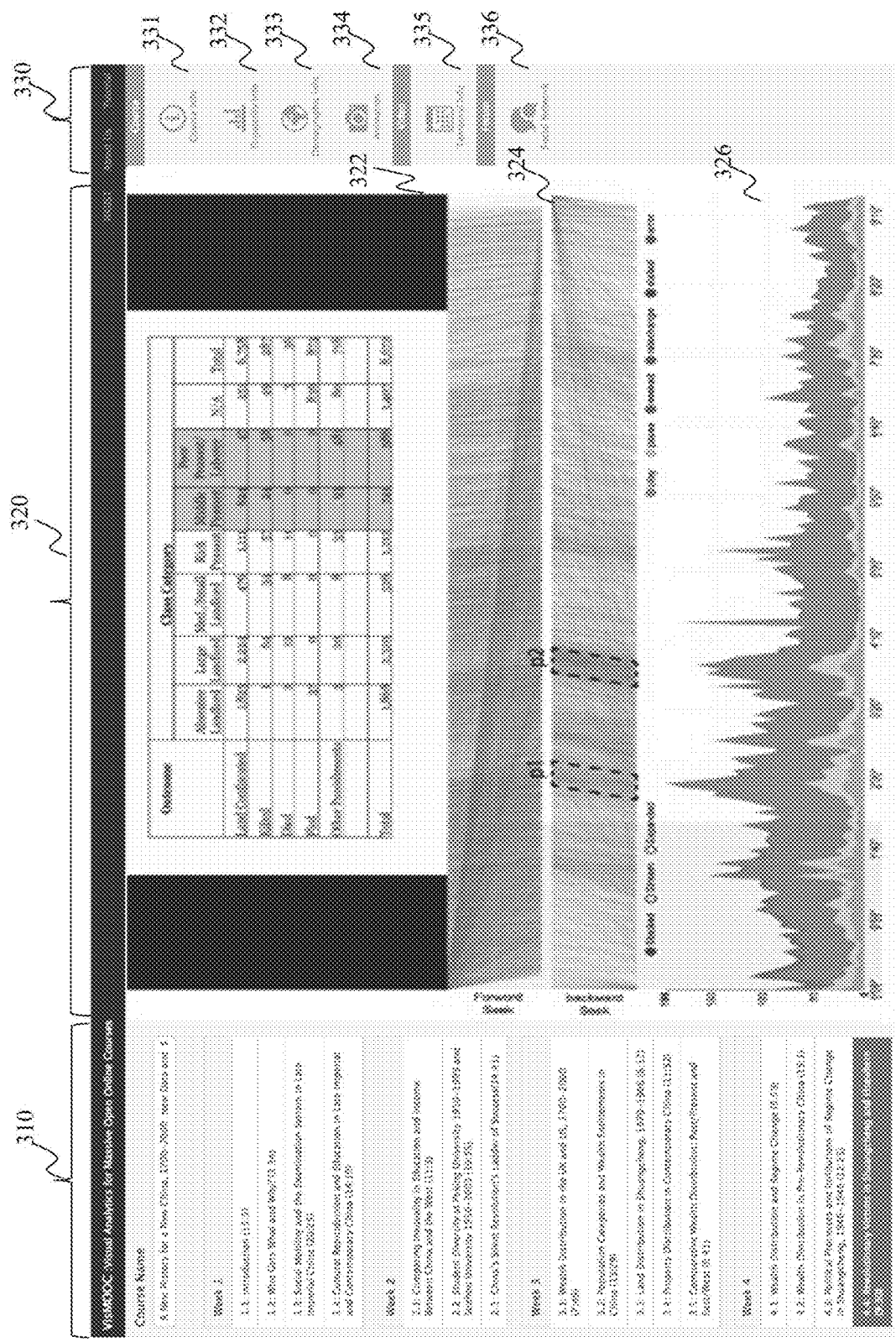
FIG. 3 illustrates an exemplary user interface for presenting a result of a video watching activity analysis, according to an embodiment of the present teaching.

FIG. 3 illustrates an exemplary user interface for presenting a result of a video watching activity analysis, according to an embodiment of the present teaching. The user interface in this example is from VisMOOC, an exemplary video watching activity analysis system for analyzing and visualizing user activities with respect to massive open online courses. As shown in FIG. 3, the user interface includes three coordinated views that show the clickstream data in different aspects as well as at different levels of details. The list view 310 shows an overview of clickstream data in different course videos, which can help analysts to select the video they are interested in. The content-based view 320 provides a seek graph 324 and an event graph 326 for an in-depth analysis of the clickstream along with the content of the video 322. The dashboard view 330 contains course information 331, video popularity information 332, demographic information 333 like geographic distribution, animation 334 from course level, temporal information 335 from video level, and social network information 336 from forum.

These three views can form a complete system that allows analysts to analyze the clickstream data. With a video-embedded design, the content in the video can help instructors to understand the patterns found in the clickstream data. The user interface of VisMOOC may support multiple interactions such as filtering and selecting. The visualizations (e.g. different graphs related to the user activities) are associated with the position in the video, and aligned with video content along a timeline of the video. For example, the x-axis of the event graph 326 represents the timeline of the video 322. As such, when the analyst clicks on a portion of the event graph 326, a corresponding portion of the video is determined, such that the system can provide the portion of video to the analyst for further study. The events may be aligned with the video second-by-second, such that a portion as described herein may correspond to a time period that is as accurate as one second.

Figure 8:
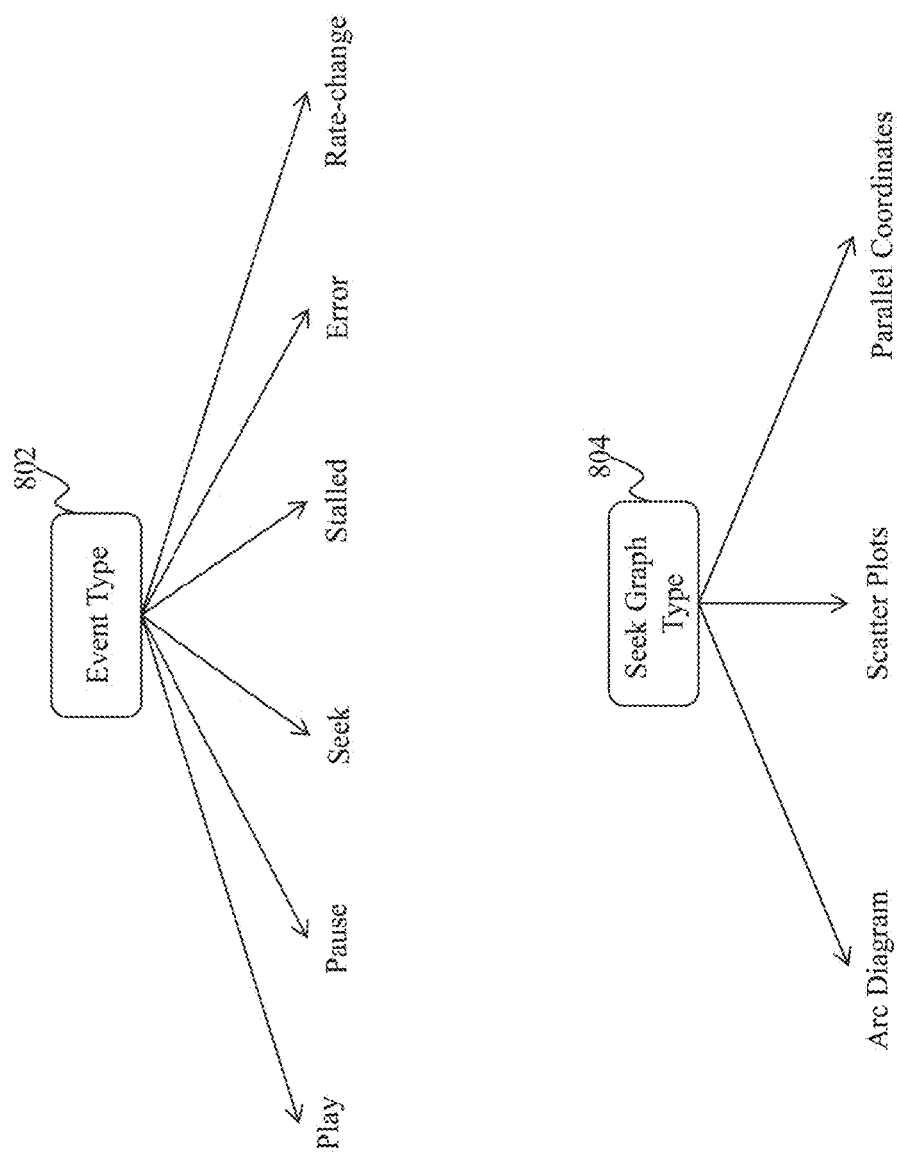
FIG. 8 illustrates examples of event types and examples of seek graph types, according to an embodiment of the present teaching.

In this embodiment, the system obtained user log data of two courses (denoted by CH and GT) offered by HKUST from Coursera, a MOOC platform. The log data include of three parts: the video clickstream data recording user interactions with the course video; the forum data containing user posting information in course forums; and the user grading data. The clickstream data contain all the events triggered by users or systems in each course video. Each data entry comprises [user ID], [timestamp], [in-video position], and [event type]. There are six event types 802: "play", "pause", "seek", "stalled", "error", and "rate-change" as shown in FIG. 8. For "seek" events, there is another field [original in-video position]. A "play" event may happen when a user plays the video, e.g. by clicking a play button. In one embodiment, when the video is loaded at the first time, it will play automatically and a play event will be recorded. A "pause" event may happen when a user pauses the video that was being played, e.g. by clicking a pause button. In one embodiment, when a video is over, a pause event will be recorded. A "seek" event may happen when a user seeks to a portion of the video, e.g. by dragging a progress bar from one position to another position, by dragging the video from one time point to another time point. A "stalled" event may happen when the video is stalled due to buffering, e.g. when Internet connection is slow or interrupted. A "rate-change" event may happen when a user changes a rate for playing the video, i.e. changing the playback rate. An "error" event may happen when there is an error of the video, e.g. when the server is down.

Figure 9:
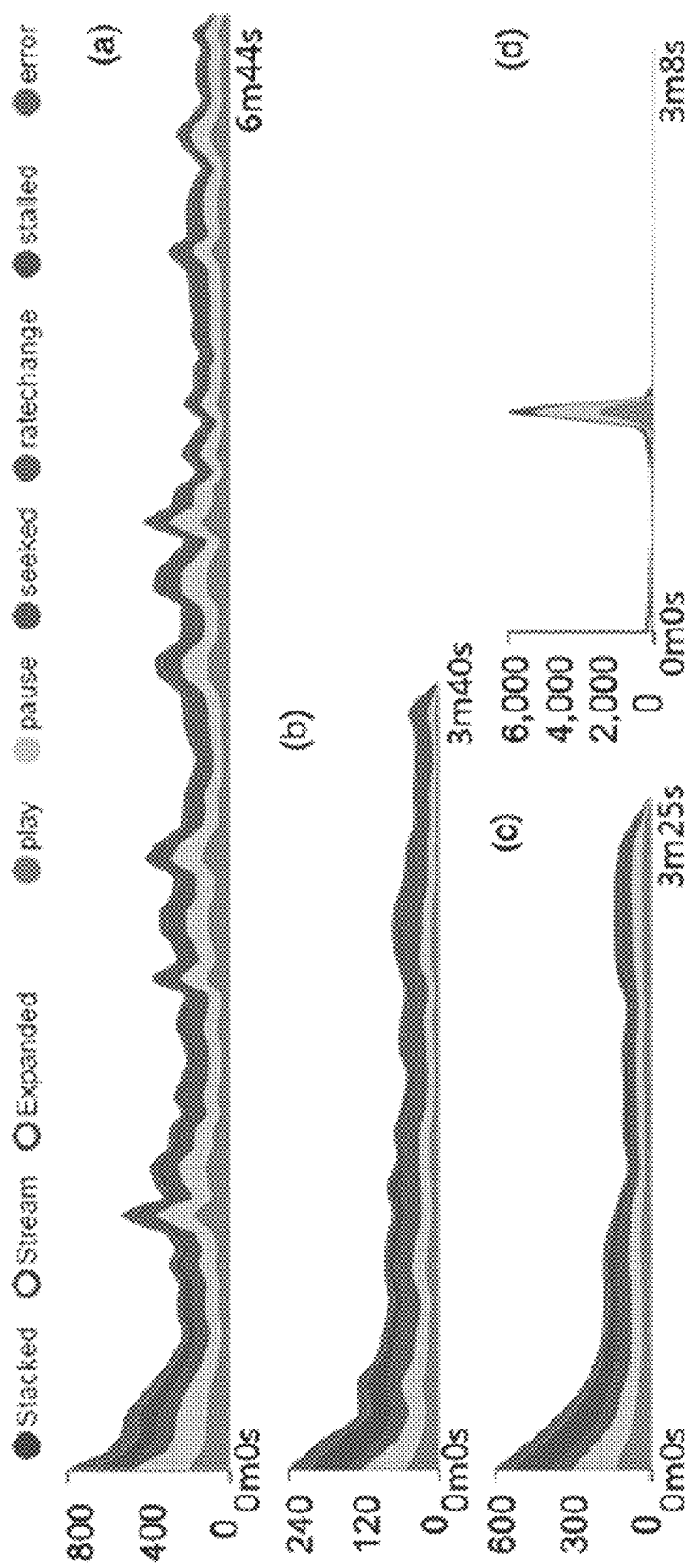
FIG. 9 illustrates event graphs showing a distribution of different clickstream event data in different types of videos, according to an embodiment of the present teaching.

An event graph may show the distribution of events on a video. Based on the event graph, people can see the number of different types of events as well as the total number of events happened at different positions in a video. FIG. 9 illustrates exemplary event graphs showing a distribution of different clickstream event data in different types of videos: (a) the lecture video, (b) the assignment video, (c) the experiment video, and (d) the experiment video with an in-video question, according to an embodiment of the present teaching. As shown in FIG. 9, an event graph may be constructed with the six types of events with second-by-second counts. The clickstream data contains six types of events. The system enables to show individual events as well as the total number of events over time. In this case, a stacked graph is a simple but effective visualization that can be used to show the information. Different grey levels are to encode different event types; and the height is to encode the number of events.

Each event graph in FIG. 9 is a stacked graph that depicts items stacked one on top of the other. A stacked event graph here can help to track changes in events added up over time, across different types of events. Events are "stacked" in this type of graph to allow the user to add up the underlying data points. A stacked line graph here may show how quantities have changed over time, such as clickstream event data, where each event type would correspond to a strip in the graph.

One can clearly see the differences between different types of videos, as shown in event graphs (a), (b), (c) in FIG. 9. In the lecture videos, several peaks can be observed and in most cases the peaks are caused by an increase in play/pause events. By exploring the peak positions within the video content, one can observe that most of the peaks happened when the video content switches to a slide. Furthermore, the height of the peak is highly related to how many words there are in the slide. This pattern indicates that usually learners like pausing a video when they see some slides. For the experiment and assignment videos, there are almost no similar peaks to those in the lecture videos. This may be because, unlike the lecture videos, there are almost no PowerPoint presentations or other text presentations in the experiment and assignment videos.

In addition, event graph (d) in FIG. 9 shows an interesting distribution of the events. In the fourth stacked graph, the abnormal peak is later confirmed by the instructors as caused by an in-video question. In Coursera, instructors are allowed to plug in some questions at some point in the video. When learners watch the video at that position, a pause action will automatically be triggered. This may mean that the events can be highly sensitive to the video content. Patterns are found when there is a question in the video. By detecting the events, users may find corresponding video content, which are important to the video viewers.

Among the six types of clickstream data, seek events may be more meaningful to represent the online students' behavior, particularly can be good indicators of learners' interest, confusion, or certain study pattern. For example, when a forward seek event happened (i.e., seeking from an earlier time point to a later time point), some content in the video are skipped, which may mean learners pay less attention on the contents; when a backward seek event happened (i.e., seeking from a later time point to an earlier time point), some contents in the video will likely be watched again, which may mean that learners pay more attention to the contents.

Figure 10:
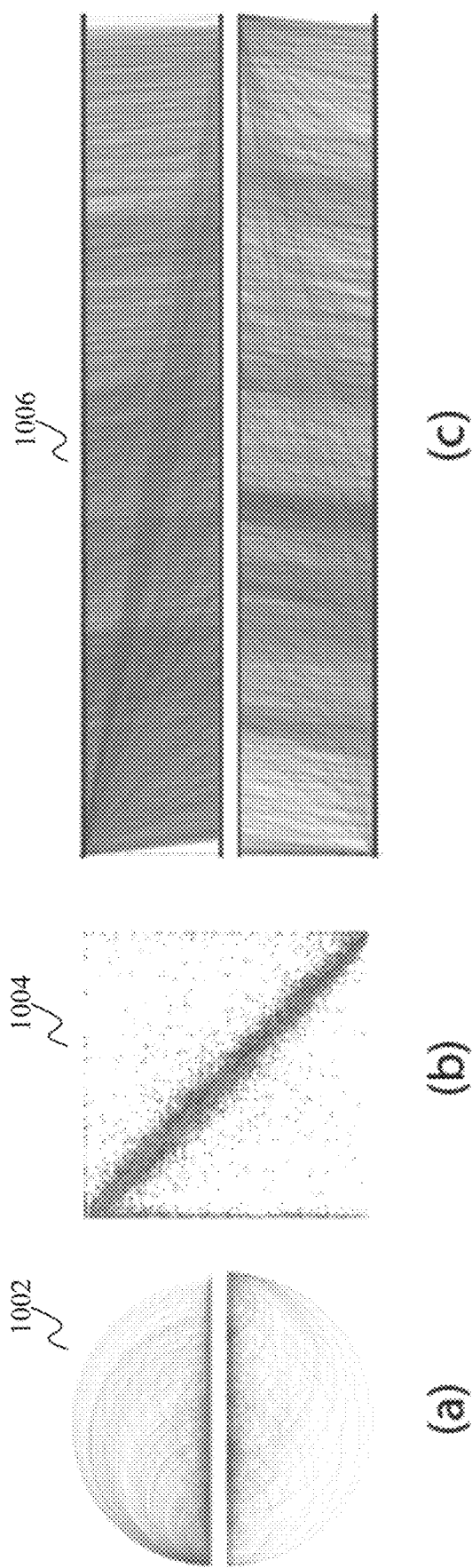
FIG. 10 illustrates different types of seek graph, according to an embodiment of the present teaching.

A seek graph may visualize the seek events of the users. As shown in FIG. 8, a seek graph may be of a seek graph type 804: an arc diagram, scatter plots, or parallel coordinates. FIG. 10 illustrates different types of seek graph, according to an embodiment of the present teaching. A seek event can be denoted as (ti, tj), where represents the starting position and tj represents the ending position in the videos. In seek graph (a) 1002, an arc diagram is used to show the referenced relation of the seek events in one-dimensional axis. The horizontal axis represents the length of the video. An arc is drawn from ti to tj for each seek event (ti, tj). Because forward seek events and backward seek events indicate opposite behaviors, the forward seeks and backward seeks are separately drawn on different spheres in the seek graph (a) 1002. The upper part shows the forward seeks and the lower part shows the backward seeks.

By exploring the data, it is found out that most of the seek events are over a short distance. However, in the arc diagram 1002, less ink ratios will be used for the short-distance seeks. To make it worse, it suffers a lot on the visual cluster problem since start points and end points of arcs are mixed together in one axis. To reduce the visual clutter problem, one natural way is to draw the starting point and ending point on two different axes. Therefore, the present teaching proposes two more visual designs of seek graph: a scatter plot design (b) 1004 with two orthogonal axes, and a parallel coordinate design (c) 1006 with two parallel axes.

In the scatter plot 1004, both the horizontal axis and the vertical axis represent the length of the video. The horizontal position shows where the seek event starts while the vertical position shows where the seek event jumps to. The seek event will then be mapped to one point in a two-dimensional space. However, it may be hard to trace the start point and the end point.

In the parallel coordinate design (c) 1006, the forward seek events and backward seek events are also separately drawn to indicate the seek events along a timeline of the video. Unlike the scatter plot 1004, two parallel axes in the parallel coordinate design (c) 1006 are used to encode the starting position and the ending position of the seek events. A line is drawn between the two axes to connect the starting and ending positions together for each seek event. Compared with the other two designs, the parallel coordinate alike design is easy to understand and shows the information more effectively.

Furthermore, a seek event can happen when learners watch the video for the first time or when they review the video. One may be interested in if there are differences between the seeking behaviors when watching the video for the first time and those when reviewing the video. Therefore, different lines are used to encode the learners' seek events happened during first time watching and those happened when watching again.

In order to further reduce visual clutter problem, one can render the lines using adaptive transparency, which can solve the visual clutter problem in parallel coordinates to make the overlaps more visible.

Figure 11:
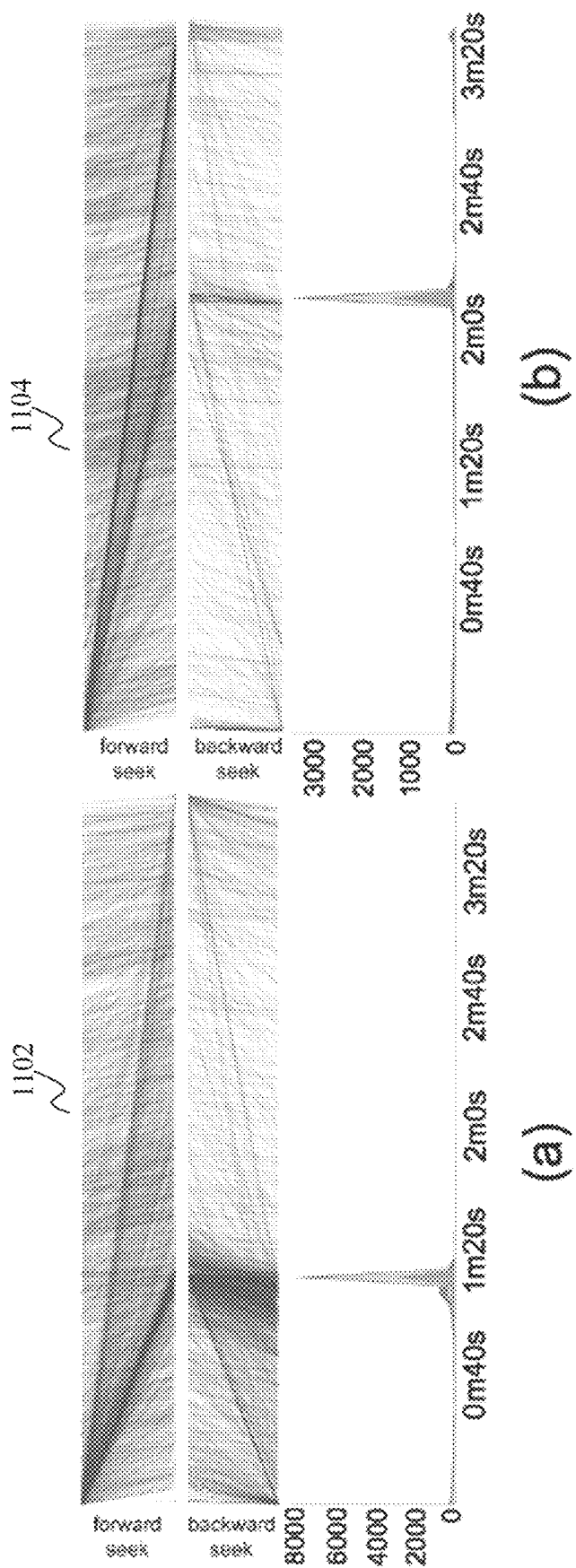
FIG. 11 illustrates a comparison between two seek graphs of two videos, according to an embodiment of the present teaching.

FIG. 11 illustrates a comparison between two seek graphs of two videos each with an in-video question, according to an embodiment of the present teaching. As shown in FIG. 11, there are obvious differences between them. Compared to the seek graph 1104, the seek graph 1102 on the left includes a considerably larger percentage of backward seek events happening around the question, while including fewer forward seek events. This pattern can indicate that the question corresponding to the seek graph 1102 is harder for the learners, which has been confirmed by the instructors for this course. There may be another explanation for this. FIG. 11 may show that before the examination, there may not be many seek events for the left question 1102. However, as the question 1102 is too difficult for the students, after the examination (may be last week of the course), there are dramatically backward seek events for the question 1102.

Figure 4:
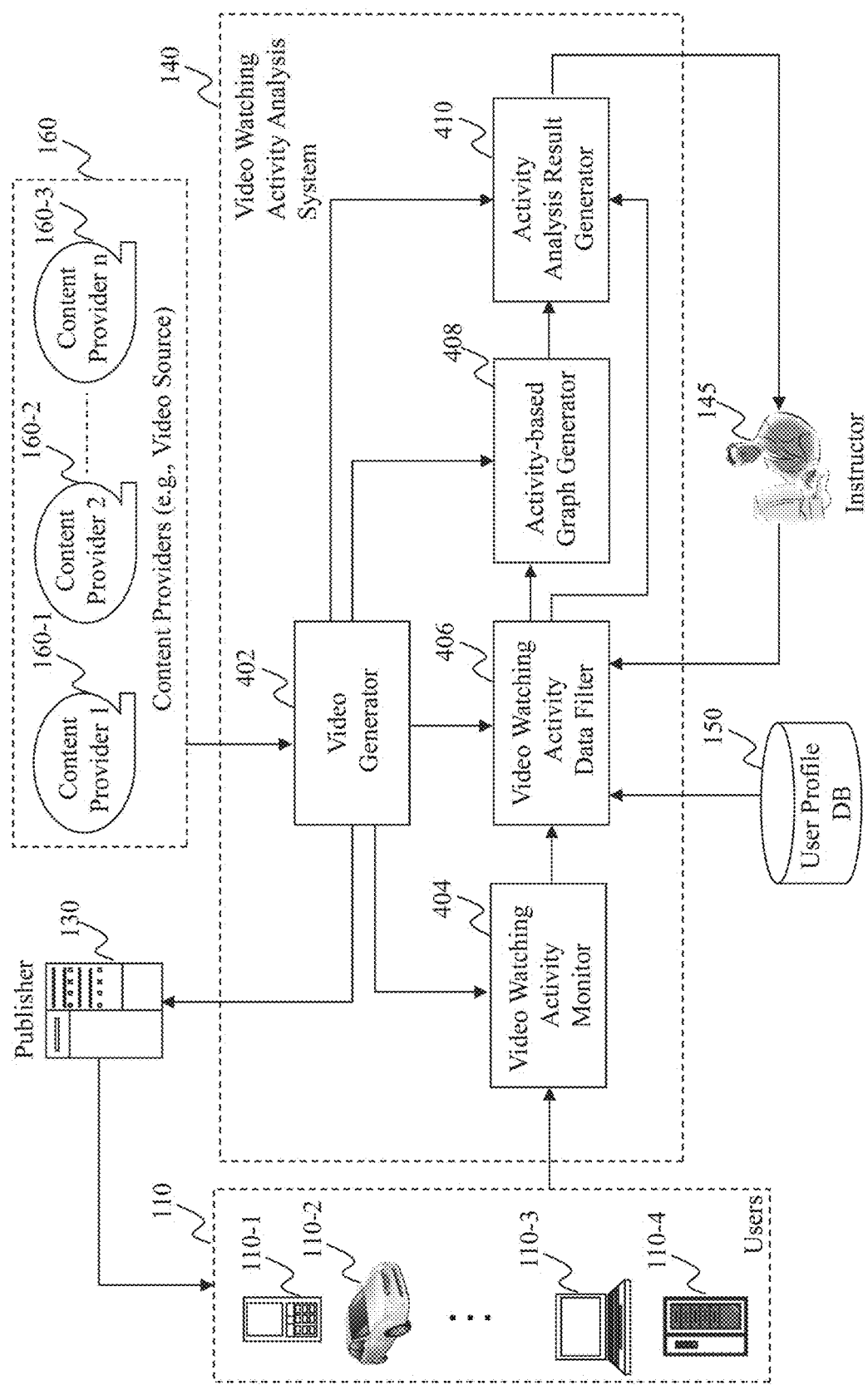
FIG. 4 is a detailed exemplary system diagram of a video watching activity analysis system, according to an embodiment of the present teaching.

FIG. 4 is a detailed exemplary system diagram of a video watching activity analysis system 140, according to an embodiment of the present teaching. The video watching activity analysis system 140 in this example includes a video generator 402, a video watching activity monitor 404, a video watching activity data filter 406, an activity-based graph generator 408, and an activity analysis result generator 410. The video generator 402 in this embodiment may obtain video content from a video source 160 and generate a video to be published by the publisher 130. In one example, the video generator 402 may obtain video content about an online lecture that is prepared by the instructor 145 and form the video based on the video content. In another example, the video generator 402 may obtain a video lecture uploaded by the instructor 145 to the video source 160 or directly to the video generator 402.

The video generator 402 may send the generated video to the publisher 130 for publishing the video to the users 110. In one embodiment, the video generator 402 may also determine the users that can watch the video based on metadata associated with the video and obtained from the video source 160. For example, a video lecture of an online course may be published to students who have registered for the course. The video generator 402 may also send information related to the video to the video watching activity monitor 404 for monitoring user activities, to the video watching activity data filter 406 for filtering activity data, to the activity-based graph generator 408 for generating visual representations of user activities, and to the activity analysis result generator 410 for generating analysis result.

The video watching activity monitor 404 in this example may monitor the users when they watch the video and detect or collect user activities or events with respect to the video. For example, the video watching activity monitor 404 may receive different video IDs from the video generator 402, where each video ID represents a video generated by the video generator 402 and published to the users 110 by the publisher 130. For each published video, the video watching activity monitor 404 can determine a group of users who may watch the video and whose behaviors with respect to the video should be monitored. Then, the video watching activity monitor 404 can monitor the group of users when each of them watches the video. It can be understood that the group of users may not watch the video at the same time. But the video watching activity monitor 404 may collect each user's activities when he/she is watching the video. As discussed above, the user activities may include play, pause, seek, stalled, error, and rate-change. The information collected by the video watching activity monitor 404 may also include metadata related to the video watching, e.g. how many times has a user watched the video or a specific portion of the video, the user's user ID, the time when the user watches the video, the user's device, operation system, web browser, and/or video playing software used for watching the video, etc. The video watching activity monitor 404 may send all of these collected user activities and information to the video watching activity data filter 406.

The video watching activity data filter 406 in this example may receive a request for analyzing user activity, e.g. from the instructor 145. The request may specify an analysis regarding a particular video and/or a particular group of users. For example, the request may specify a video ID of a video lecture and students of the lecture who are from a particular country, e.g. United States. Based on the request, the video watching activity data filter 406 may obtain the video corresponding to the video ID from the video generator 402 and retrieve user profiles of the users who are from US. Then, the video watching activity data filter 406 may filter the activity data to generate filtered activity information based on the request. Referring to the above example, the video watching activity data filter 406 may collect US students' activities performed when they watch the video lecture, and send the activity data and related metadata to the activity-based graph generator 408 for generating visual representations of the activities, and to the activity analysis result generator 410 for generating an analysis result.

The activity-based graph generator 408 in this example may generate one or more visual representations of the activities, e.g. an event graph and/or a seek graph of the users' video watching activities. As discussed above, the event graph may show different kinds of user activities or clickstream events; and the seek graph may show seek events of the users along a timeline of the video. Each of the one or more visual representations includes different parts each of which corresponds to a different portion of the video along a timeline of the video. As such, when a user or the instructor 145 clicks on any part in any one of the one or more visual representations, a corresponding portion of the video is activated to be played for the instructor 145 to see the content of the portion. The events shown in the generated graphs may be aligned with the video second-by-second, such that a portion as described herein may correspond to a time period that is as accurate as one second. The activity-based graph generator 408 may send the generated visual representations to the activity analysis result generator 410 for generating an analysis result.

The activity analysis result generator 410 in this example can generate the analysis result for a video based on information about the video from the video generator 402, the visual representations generated by the activity-based graph generator 408, and the activity data with respect to the video from the video watching activity data filter 406. The activity analysis result generator 410 may provide the analysis result in a user interface shown in FIG. 3 to the instructor 145, wherein the analysis result includes different coordinated views that show the clickstream data in different aspects as well as at different levels of details. In one embodiment, after the instructor 145 receives the analysis result, the instructor 145 may modify the video lecture based on the analysis result, e.g. by uploading a newer version of the video lecture to the content providers 160, or to the video watching activity analysis system 140 directly. In another embodiment, after the instructor 145 receives the analysis result, the instructor 145 may send another request to the video watching activity data filter 406 for a further analysis of the user activities.

Figure 5:
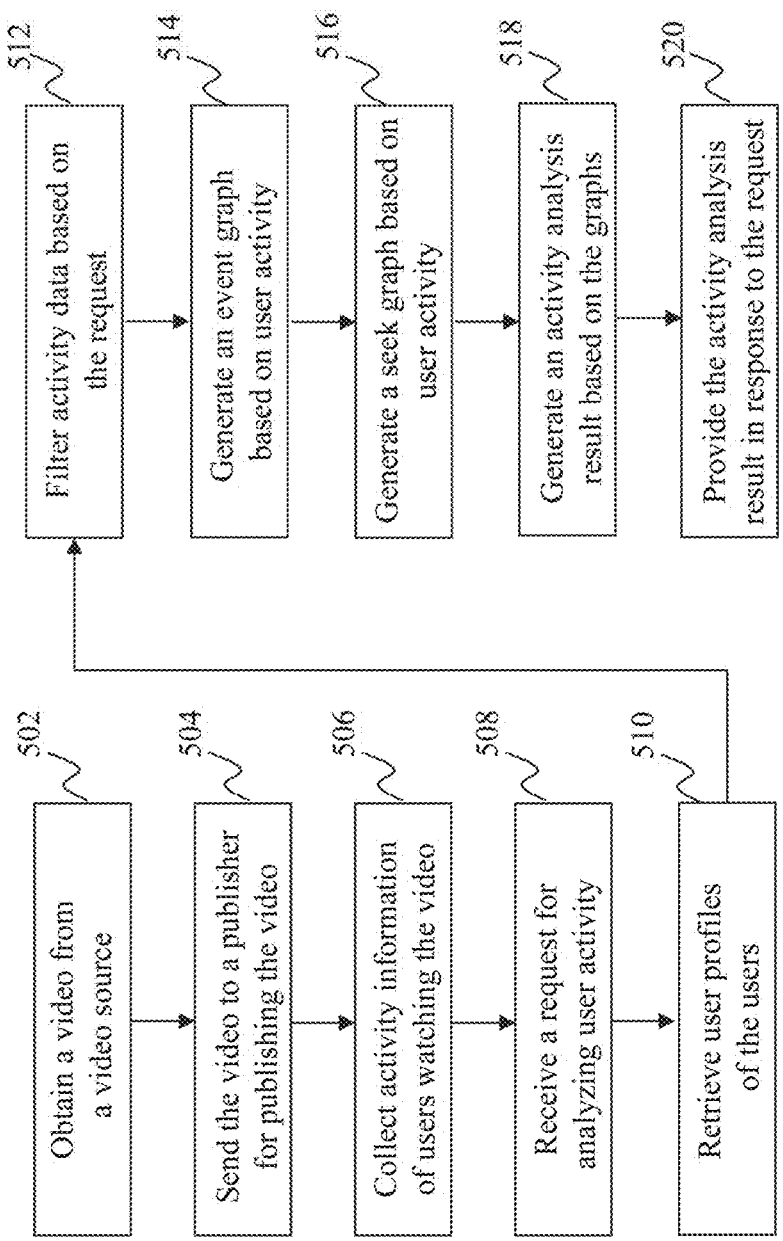
FIG. 5 is a flowchart of an exemplary process performed by a video watching activity analysis system, according to an embodiment of the present teaching.

FIG. 5 is a flowchart of an exemplary process performed by a video watching activity analysis system, e.g. the video watching activity analysis system 140 in FIG. 4, according to an embodiment of the present teaching. A video is obtained at 502 from a video source. The video is sent at 504 to a publisher for publishing the video. Users watching the video are monitored at 506 for collecting information about user activities during watching the video. A request is received at 508 for analyzing the user activities. User profiles of at least some of the users are retrieved at 510 based on the request.

User activity data are filtered at 512 based on the request. An event graph is generated at 514 based on user activity. A seek graph is generated at 516 based on user activity. An activity analysis result is generated at 518 based on the graphs. At 520, the activity analysis result is provided in response to the request. It can be understood that the order of the steps shown in FIG. 5 may be changed according to different embodiments of the present teaching.

Figure 6:
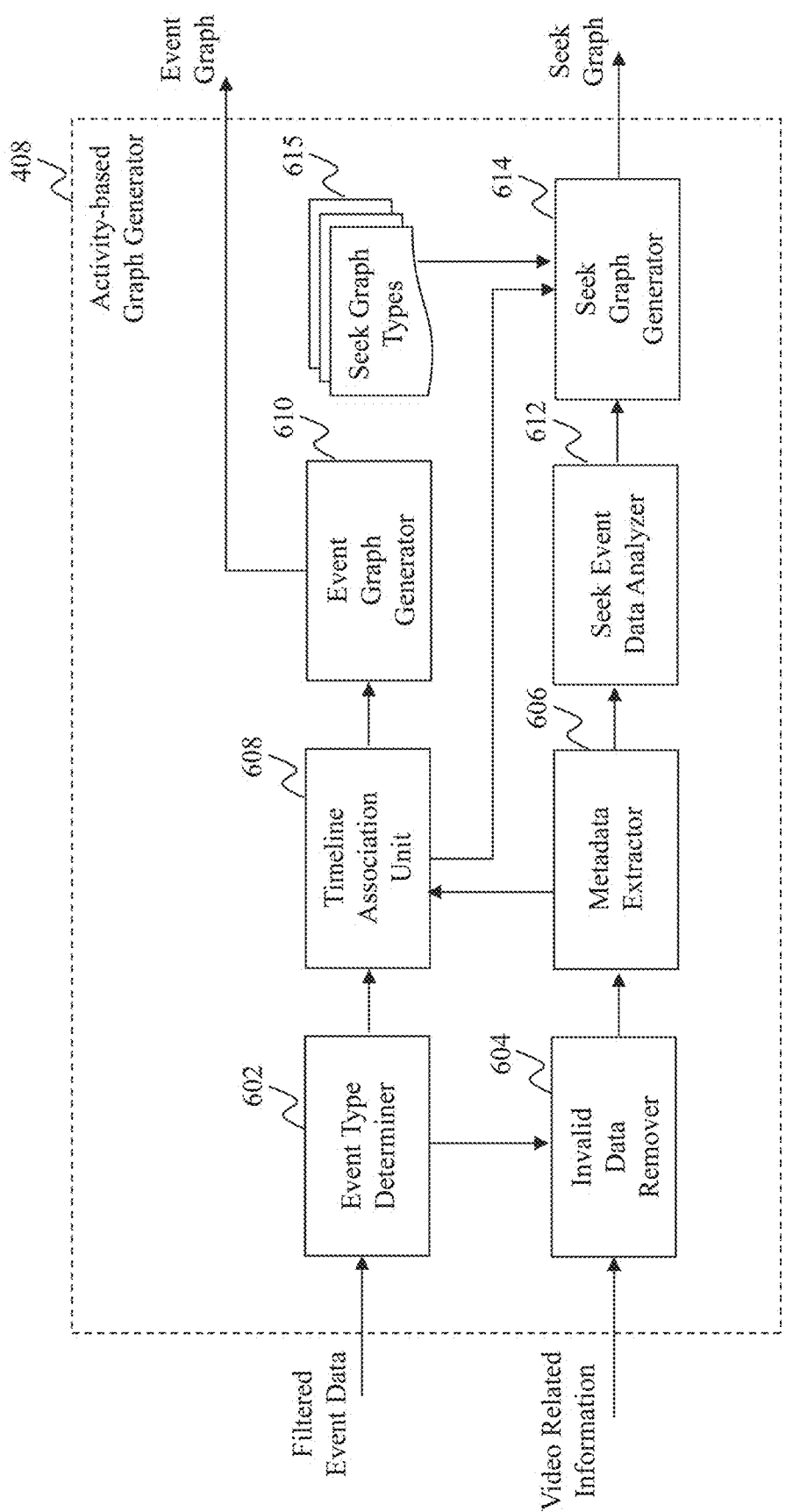
FIG. 6 is a detailed exemplary system diagram of an activity-based graph generator, according to an embodiment of the present teaching.

FIG. 6 is a detailed exemplary system diagram of an activity-based graph generator 408, according to an embodiment of the present teaching. The activity-based graph generator 408 in this example includes an event type determiner 602, an invalid data remover 604, a metadata extractor 606, a timeline association unit 608, an event graph generator 610, a seek event data analyzer 612, a seek graph generator 614, and one or more seek graph types 615.

The event type determiner 602 in this example receives filtered event data from the video watching activity data filter 406. The filtered event data may be related to various user events during watching the video. The event type determiner 602 may determine an event type for each of the user events, e.g. whether a user event is play, pause, seek, stalled, error, or rate-change. The event type determiner 602 may send the user event data together with their associated event types to the invalid data remover 604 for removing invalid data and to the timeline association unit 608 for timeline association.

The invalid data remover 604 in this example can receive the user event data from the event type determiner 602 and remove invalid data from the user event data based on each event type obtained from the event type determiner 602 and video related information obtained from the video watching activity data filter 406. The video related information may include length of the video, playing rate available for the video, etc. For example, a "pause" event happening right after a "stalled" event is invalid because the video cannot be paused when being stalled. For example, a "seek" event having a jumping length (i.e. the time period between the starting point and the end point of the seek event) longer than the length of the video is invalid because a user cannot seek to a position outside the video. For example, a "rate-change" event is invalid if the rate is changed to a rate value that is not available or not supported by the video's format. The invalid data remover 604 can remove the invalid data to generate clean data for each event type. The invalid data remover 604 may send the clean data to the metadata extractor 606 for metadata extraction.

The metadata extractor 606 in this example can extract metadata associated with each event type from the clean data. The clean data may be raw data that is not in a right format for generating the visual representations or graphs. For example, a seek event may be collected with an event time and an end position of the seek event. To obtain the start position of the seek event, the metadata extractor 606 may extract metadata to determine the event time and determine the start position of the seek event based on metadata of an event right before the seek event, e.g. a play event or a pause event. As such, the metadata extractor 606 can change the activity data to be in a right format for generating visual representations or graphs. The metadata extractor 606 may send the formatted activity data to the timeline association unit 608 for timeline association. For seek events, the metadata extractor 606 may also send the formatted seek event data to the seek event data analyzer 612 for further analysis.

The timeline association unit 608 in this example may associate each event with a timeline of the video, based on a position in the video corresponding to when the event happens. As such, each event may be aligned with the video, e.g. second-by-second. The timeline association unit 608 may send the aligned events to the event graph generator 610 for generating an event graph and to the seek graph generator 614 for generating a seek graph.

The event graph generator 610 in this example receives the aligned events of different types from the timeline association unit 608 and generates the event graph along a timeline of the video. An event graph may indicate a quantity of users performing each type of the user activities with respect to different portions of the video. The event graph 326 shown in FIG. 3 is an exemplary event graph showing different types of events with respect to the video 322. The event graph generator 610 may send the event graph to the activity analysis result generator 410 for generating an analysis result, e.g. via a user interface as shown in FIG. 3.

The seek event data analyzer 612 in this example can analyze the seek event data obtained from the metadata extractor 606. For example, the seek event data analyzer 612 may determine each seek event is a forward seek event or a backward seek event, and separate data of the forward seek events from data of the backward seek events. The seek event data analyzer 612 may send the analyzed seek event data to the seek graph generator 614 for generating a seek graph.

A seek graph may visualize the seek events of the users. As discussed above, there may be different types of seek graphs, e.g. an arc diagram, scatter plots, or parallel coordinates, as shown in FIG. 8 and FIG. 10. The seek graph generator 614 in this example may determine and select one of the seek graph types 615 and generate a corresponding seek graph based on the analyzed seek event data from the seek event data analyzer 612 and timeline alignment information from the timeline association unit 608. The seek graph 324 shown in FIG. 3 is an exemplary seek graph based on parallel coordinates for indicating seek activities of the users along a timeline of the video 322. The seek graph generator 614 may send the seek graph to the activity analysis result generator 410 for generating an analysis result, e.g. via a user interface as shown in FIG. 3.

Figure 7:
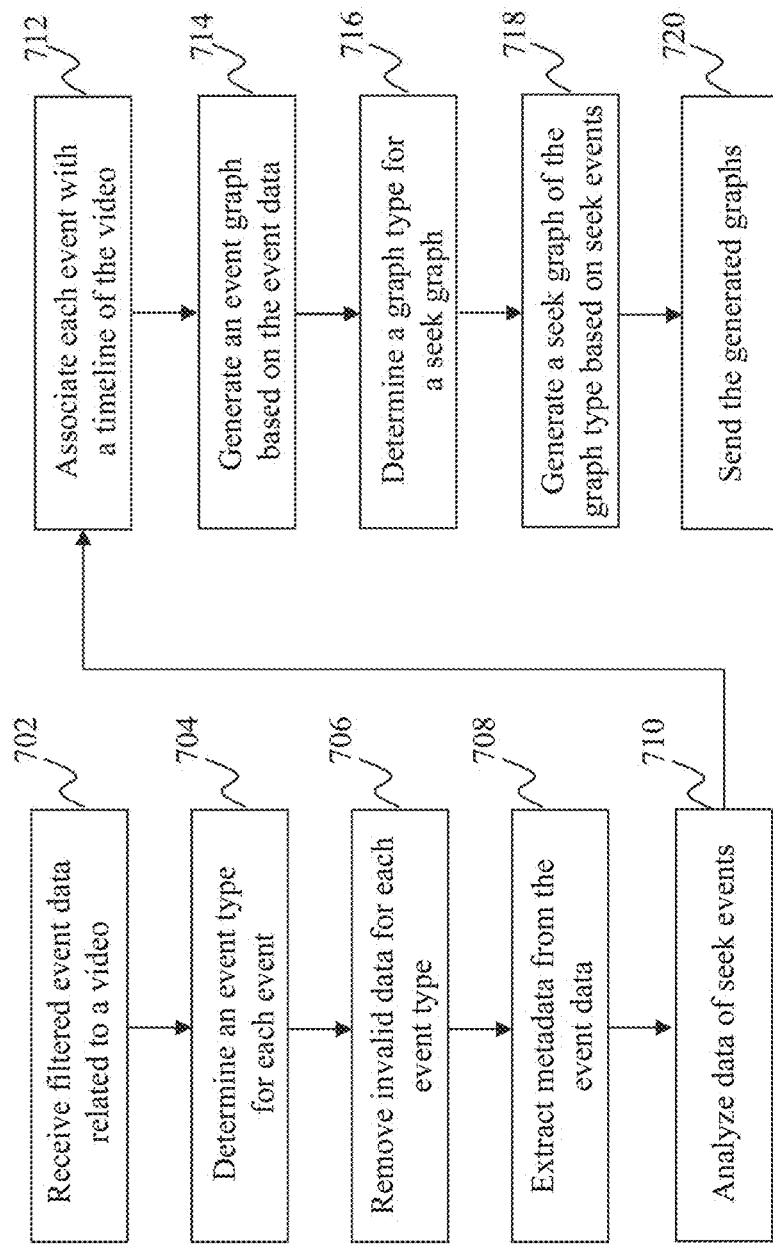
FIG. 7 is a flowchart of an exemplary process performed by an activity-based graph generator, according to an embodiment of the present teaching.

FIG. 7 is a flowchart of an exemplary process performed by an activity-based graph generator, e.g. the activity-based graph generator 408 in FIG. 6, according to an embodiment of the present teaching. At 702, filtered event data related to a video are received. At 704, an event type is determined for each event. Invalid data is removed at 706 for each event type. Metadata are extracted at 708 from the event data. At 710, data of seek events are analyzed.

Each event is associated at 712 with a timeline of the video. An event graph is generated at 714 based on the event data. A seek graph type is determined at 716 for a seek graph. A seek graph of the seek graph type is generated at 718 based on the seek event data. At 720, the generated graphs are sent for generating an analysis result. It can be understood that the order of the steps shown in FIG. 7 may be changed according to different embodiments of the present teaching.

Figure 12:
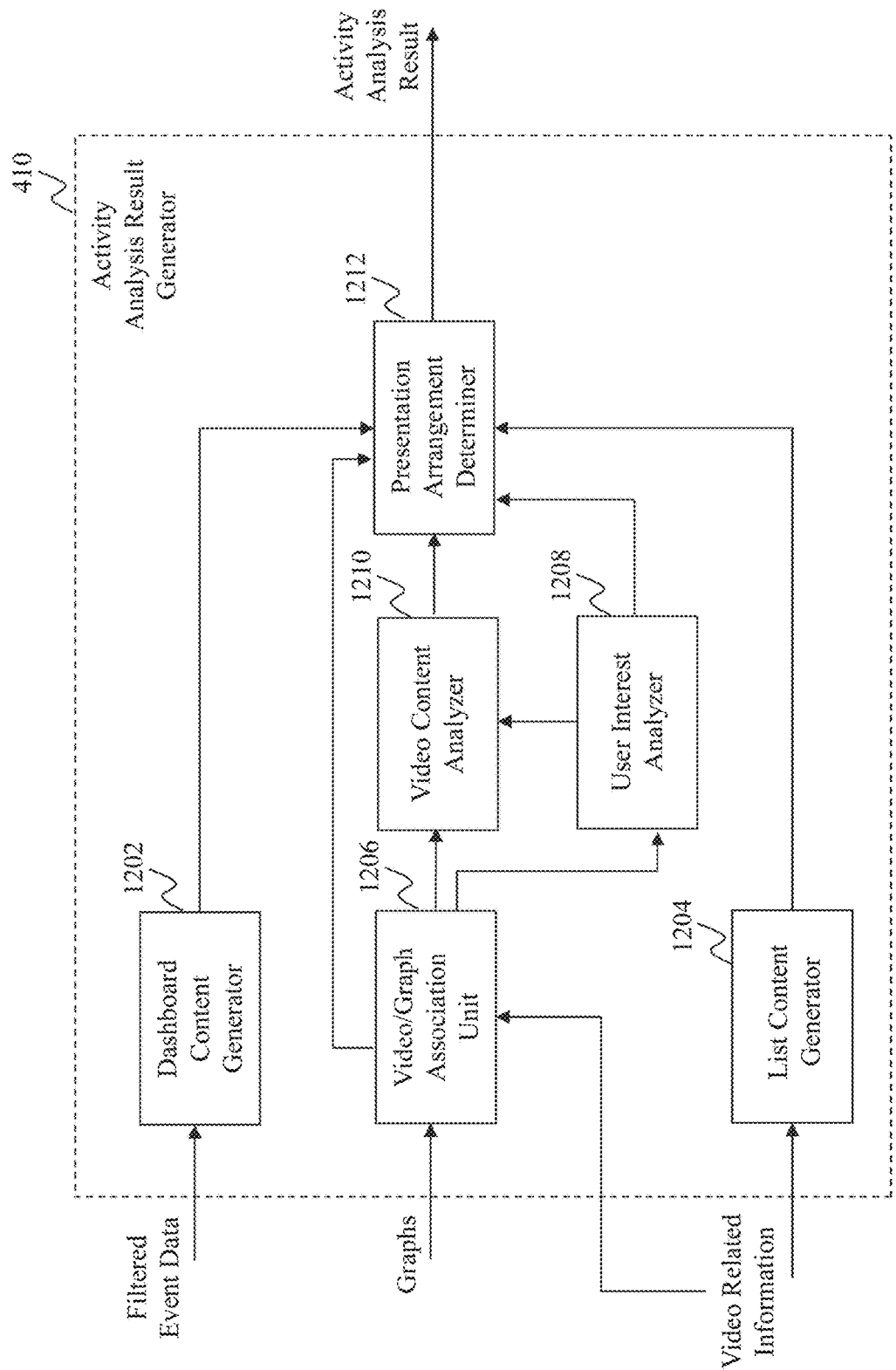
FIG. 12 is a detailed exemplary system diagram of an activity analysis result generator, according to an embodiment of the present teaching.

FIG. 12 is a detailed exemplary system diagram of an activity analysis result generator 410, according to an embodiment of the present teaching. The activity analysis result generator 410 in this example includes a dashboard content generator 1202, a list content generator 1204, a video/graph association unit 1206, a user interest analyzer 1208, a video content analyzer 1210, and a presentation arrangement determiner 1212.

The dashboard content generator 1202 in this example may receive filtered event data related to a video from the video watching activity data filter 406. Based on the filtered event data, the dashboard content generator 1202 may generate dashboard content related to the video to be put into a dashboard view in an analysis result. For example, the dashboard view 330 shown in FIG. 3 contains various content, including course information 331, video popularity information 332, demographic information 333 like geographic distribution, animation 334 from course level, temporal information 335 from video level, and social network information 336 from forum. The dashboard content generator 1202 may send the generated dashboard view to the presentation arrangement determiner 1212 for determining a presentation of the analysis result.

The list content generator 1204 in this example may receive video related information from the video generator 402. Based on the video related information, the list content generator 1204 may generate list content related to the video to be put into a list view in an analysis result. For example, the list view 310 shown in FIG. 3 shows an overview of clickstream differences in among course videos, which can help analysts to select the video or a portion of the video they are interested in. The list content generator 1204 may send the generated list view to the presentation arrangement determiner 1212 for determining a presentation of the analysis result.

The video/graph association unit 1206 in this example may receive video related information from the video generator 402 and the visual representation, e.g. graphs of the user activities from the activity-based graph generator 408. The video/graph association unit 1206 may associate the video with the graphs along a timeline of the video. For example, the seek graph 324 and the event graph 326 in FIG. 3 are associated with each other and associated with the video 322. As such, when a user or the instructor 145 clicks on any part in any one of the graphs, a corresponding portion of the video may be activated to be played and a corresponding portion of each of the other graphs may be selected and/or highlighted. The video 322 and the visual representations, e.g. the seek graph 324 and the event graph 326 form a content-based view 320 in FIG. 3 for providing an in-depth analysis of the clickstream data. The video/graph association unit 1206 may send the generated content view to the presentation arrangement determiner 1212 for determining a presentation of the analysis result; to the video content analyzer 1210 for analyzing the video content; and to the user interest analyzer 1208 for analyzing user interests.

In one embodiment, it is important for the instructor 145 to understand the learning behaviors in different scales, including the time scales and the learner scales. Visualizations and interaction techniques disclosed herein can help instructors to explore the data in different scales. In addition, understanding the learning behaviors from different perspectives is also important for the instructors. The system disclosed herein provides multiple coordinated views (e.g. list view, dashboard view, content view) with each view encoding information from a unique perspective.

The user interest analyzer 1208 in this example may determine interests of at least some of the users with respect to different portions of the video based on the graphs. Each of the graphs can capture a level of attention paid by the users to the different portions of the video at any time instance or capture a distribution of the users who performed different activities with respect to each of the different portions of the video. As such, the user interest analyzer 1208 can determine how interesting a portion of the video is to the users of concern, based on the graphs associated with the video. The user interest analyzer 1208 may send the user interests with respect to different video portions to the video content analyzer 1210 for analyzing the video content, and to the presentation arrangement determiner 1212 for determining a presentation of the analysis result.

The video content analyzer 1210 in this example may analyze content of the video based on the associated graphs. For example, the video content analyzer 1210 may determine which portion of the video is of particular importance, e.g. more interesting to the students, less interesting to the students, difficult to understand for the students, more attention paid by the students, etc. In one embodiment, the video content analyzer 1210 may generate a ranked list of different portions of the video based on their respective level of importance. The higher a video portion is ranked in the list, the more attention should be paid by the instructor 145 to the video portion based on the analysis result. The video content analyzer 1210 may send the result, e.g. the ranked list of different portions of the video to the presentation arrangement determiner 1212 for determining a presentation of the analysis result.

The presentation arrangement determiner 1212 in this example may determine an arrangement for presenting an analysis result. In one embodiment, the analysis result may include different coordinated views (e.g. list view, dashboard view, content view including a seek graph and an event graph associated with the video). In another embodiment, the analysis result may also include information about user interests determined by the user interest analyzer 1208 and/or the ranked list of different portions of the video generated by the video content analyzer 1210. The presentation arrangement determiner 1212 can determine how to present the different components of the analysis result in a user interface, e.g. the user interface shown in FIG. 3. Based on the determined presentation arrangement, the presentation arrangement determiner 1212 may generate and provide the activity analysis result to the instructor 145.

Figure 13:
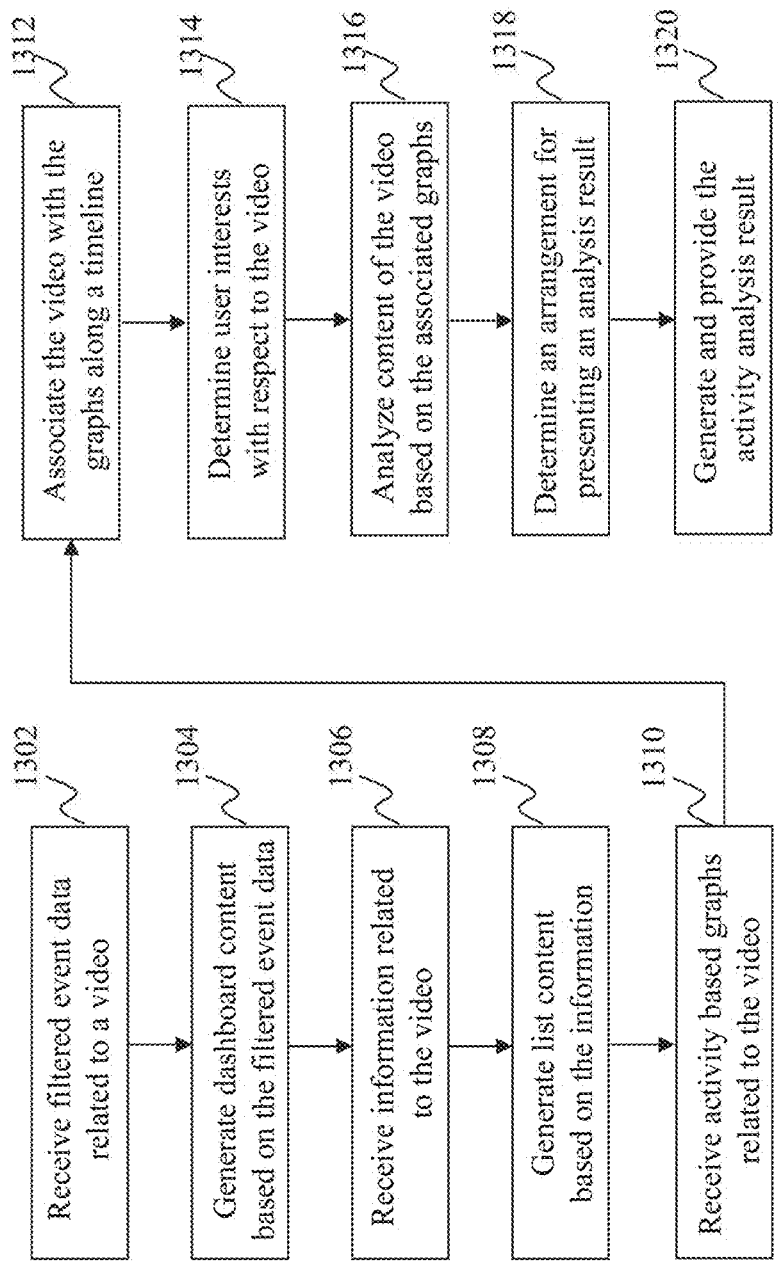
FIG. 13 is a flowchart of an exemplary process performed by an activity analysis result generator, according to an embodiment of the present teaching.

FIG. 13 is a flowchart of an exemplary process performed by an activity analysis result generator, e.g. the activity analysis result generator 410 in FIG. 12, according to an embodiment of the present teaching. Filtered event data related to a video are received at 1302. Dashboard content is generated at 1304 based on the filtered event data. Information related to the video is received at 1306. List content is generated at 1308 based on the information. Visual representations, e.g. graphs of user activities related to the video, are received at 1310.

The video is associated at 1312 with the graphs along a timeline of the video. User interests with respect to the video are determined at 1314. At 1316, content of the video is analyzed based on the associated graphs. At 1318, an arrangement for presenting an analysis result is determined. The activity analysis result is generated and provided at 1320. It can be understood that the order of the steps shown in FIG. 13 may be changed according to different embodiments of the present teaching.

An instructor may want to understand the learning behaviors of students in different scales, including the time scales and the student scales, and from different perspectives. The system disclosed herein provides multiple coordinated views, and some visualizations and interaction techniques that can help instructors explore the data in different scales as needed.

Figure 14:
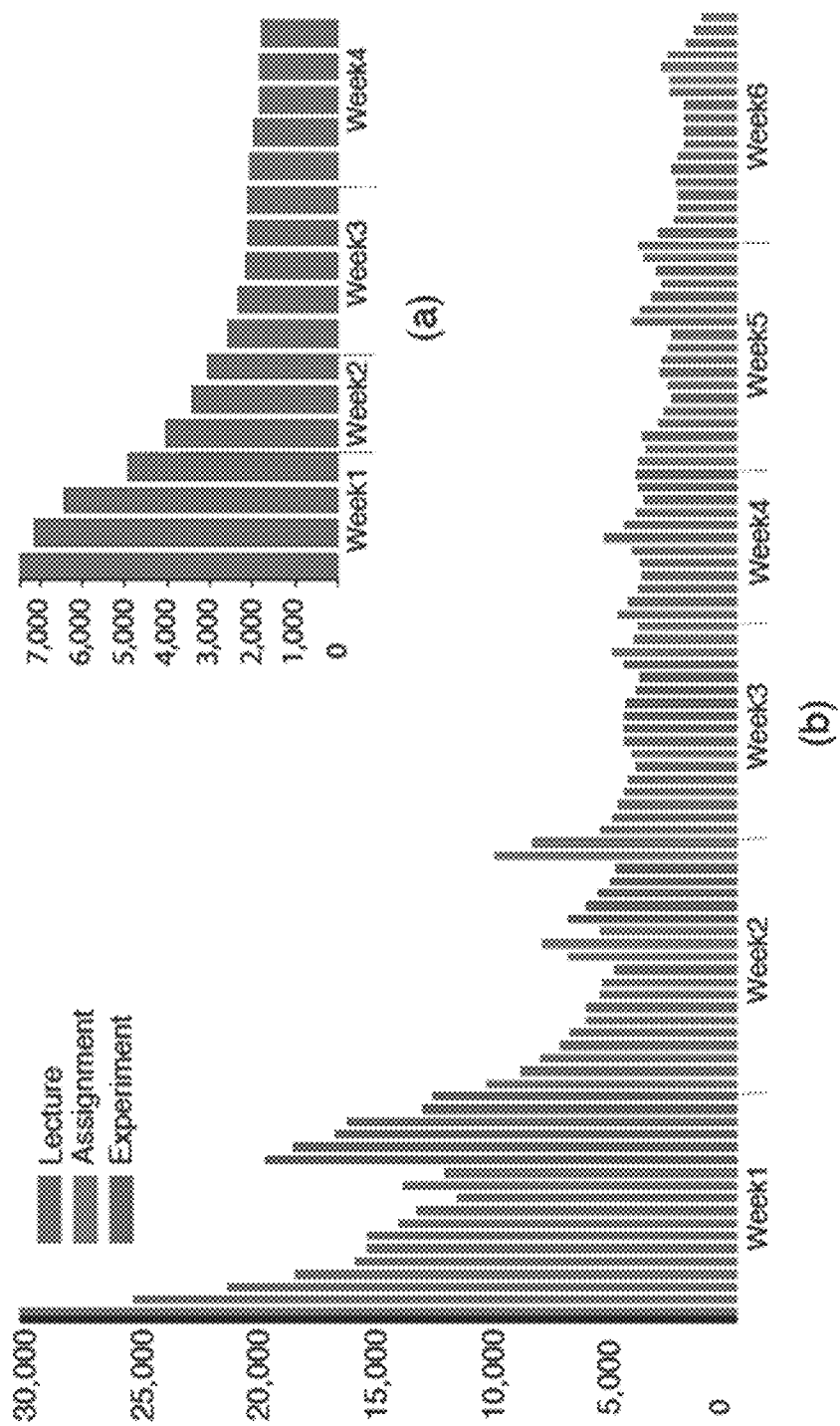
FIG. 14 shows histograms representing popularity of videos, according to an embodiment of the present teaching.

FIG. 14 shows histograms representing popularity of videos, according to an embodiment of the present teaching. As shown in FIG. 14, numbers of learners in different weeks for different video types (lecture, assignment, and experiment) are represented by histograms. One can see that the popularity becomes stable after two weeks for both courses (a) and (b).

Figure 15:
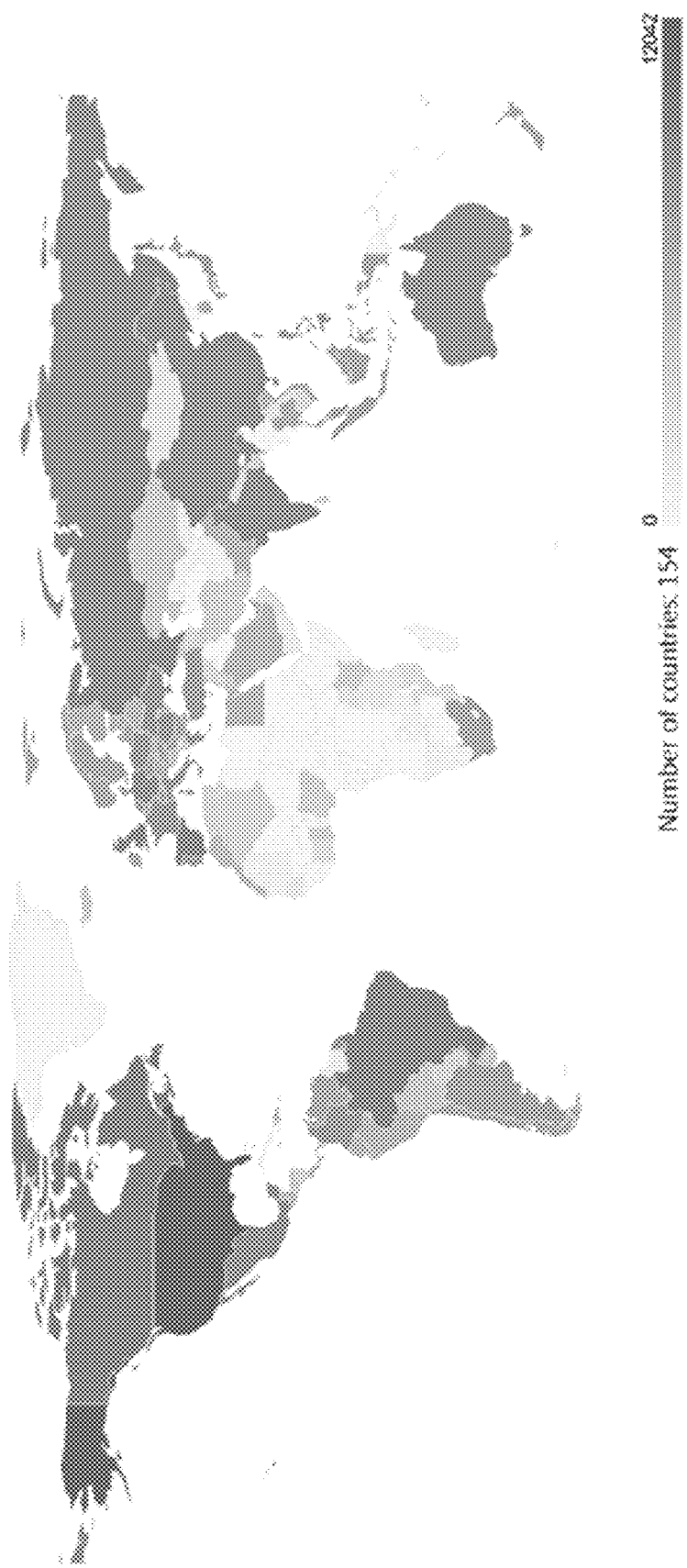
FIG. 15 illustrates a distribution of users around the world, according to an embodiment of the present teaching.

FIG. 15 illustrates a distribution of users around the world, according to an embodiment of the present teaching. As shown in FIG. 15, a world map shows the distribution of learners around the world for the course GT. One can see that the majority of learners are from the US, while the learners in total are from more than 150 countries.

Figure 16:
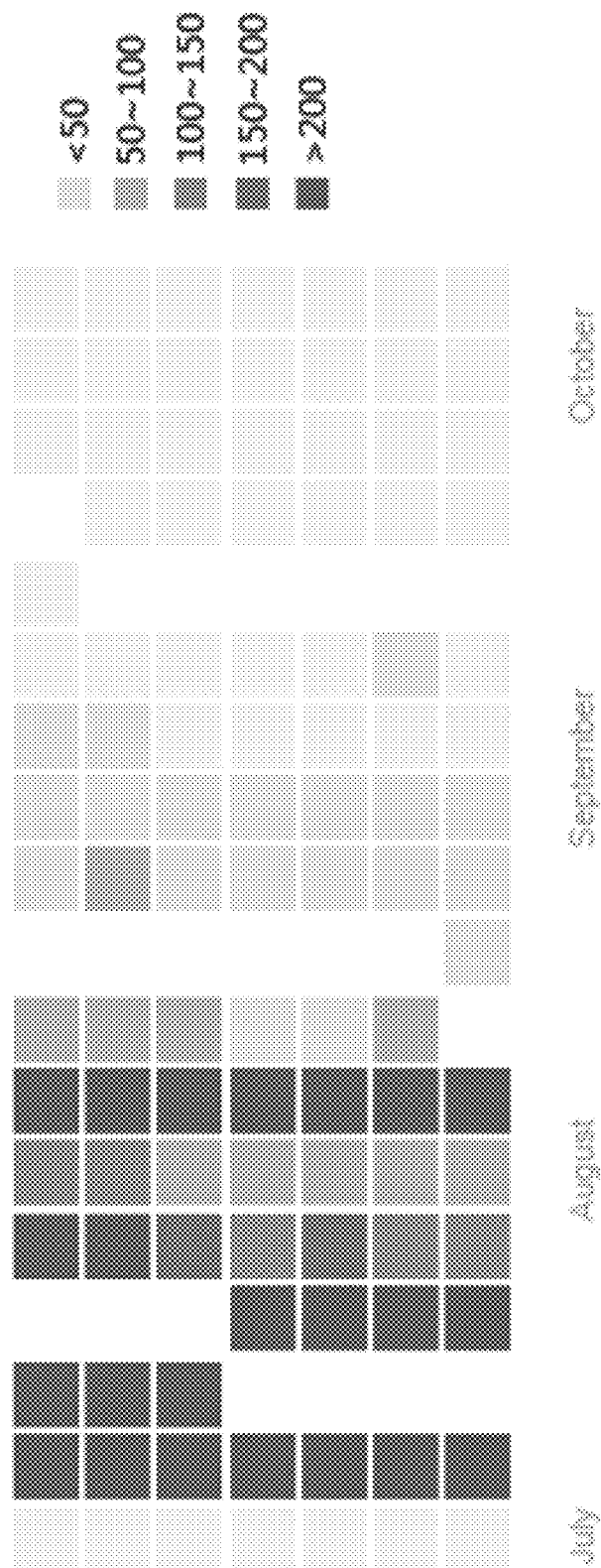
FIG. 16 shows a calendar view of the temporal popularity for a video, according to an embodiment of the present teaching.

FIG. 16 shows a calendar view of the temporal popularity for a video, according to an embodiment of the present teaching. The calendar view in FIG. 16 shows a day by day popularity of a selected video. One can see that there are two weeks with a lot of actions. The popularity in FIG. 16 decreases at first, but then increases weeks after. By referring to the course syllabus, it is found that the increase appeared a week before the exam.

Figure 17:
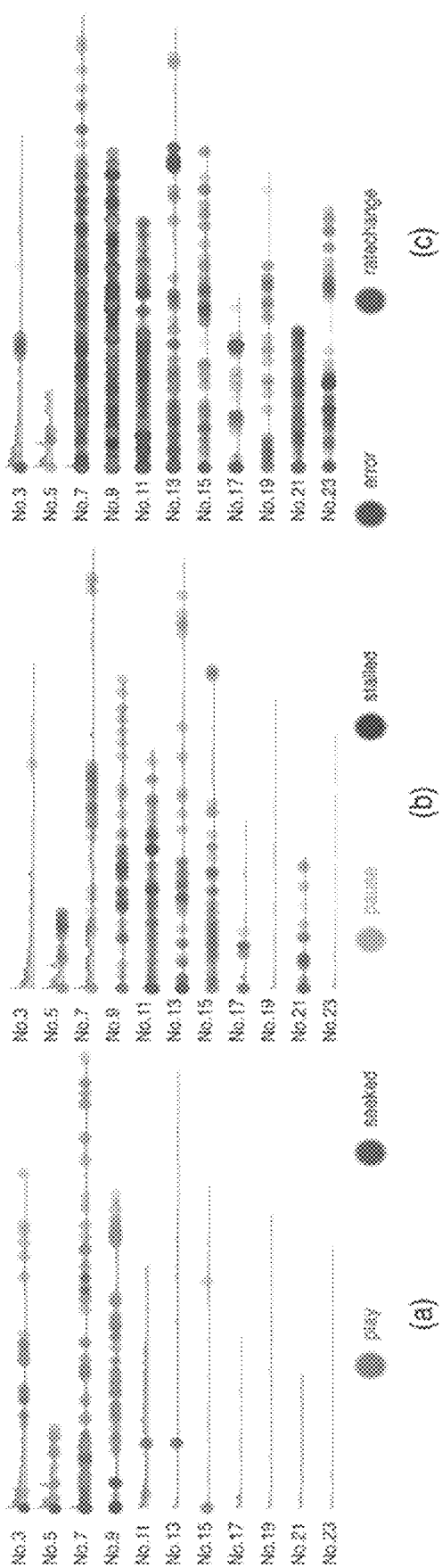
FIG. 17 illustrates exemplary patterns of different events, according to an embodiment of the present teaching.

FIG. 17 illustrates exemplary patterns of different events, according to an embodiment of the present teaching. Animations in FIG. 17 can show three patterns: (a) pause events and play events are dominant when learners watch the videos for the first time; (b) seek events are dominant when learners review the videos; and (c) there is a burst of events in the exam day. The animation is also supported for experts to see clickstream data by time. By watching the animations, one can find some interesting patterns shown in FIG. 17. The first burst of click actions appears almost on all course videos followed by another more acute burst on a specific day (August 26th). The first burst corresponds to the findings in the calendar view. The second one happens precisely on exam day, while it is barely observable in the calendar view. After the exam day, all the clickstream activities cease dramatically. Another interesting thing from the animation is that "pause" and "play" are the dominant events in the release week when learners are watching the videos for the first time, whereas seek becomes the most frequent event when learners are reviewing those videos. This may be reasonable since when learners watch the videos for the first time, they have no ideas about which parts are important and would pause more often in order to better understand the content. On the contrary, when learners re-watch the videos, most of them have a specific need and watch some parts selectively. In this sense, they would have a higher probability of using the seek function compared to first-time viewers.

Figure 18:
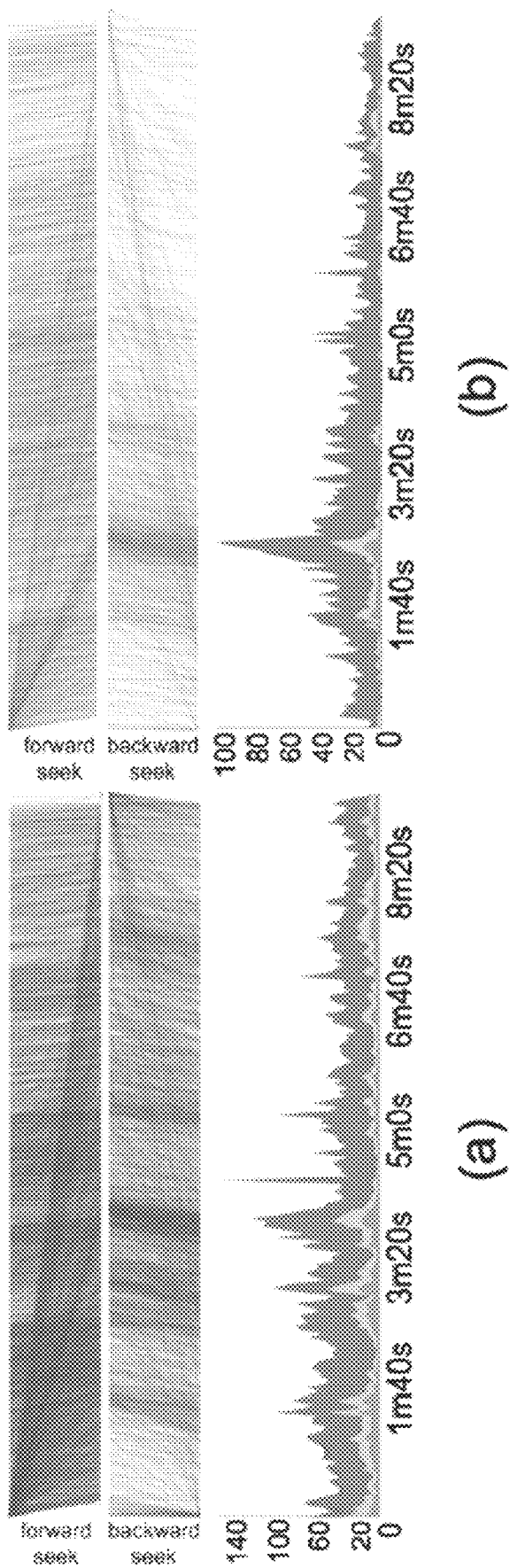
FIG. 18 illustrates content-based views (including seek graphs and event graphs), according to an embodiment of the present teaching.

FIG. 18 illustrates content-based views (including seek graphs and event graphs), according to an embodiment of the present teaching. The content views in FIG. 18 are for the same video shown in FIG. 3, but with different time periods: (a) the clickstream data from the first week when the video is released; and (b) the clickstream data from the week when the related assignment released. One can find that coordinated analysis plays an important role for analyzing complex patterns. There is a strange pattern in the seek graph 324. There are two positions with dense backward seek events, however, the earlier position (p1) is filled by the seek events that happened when learners reviewed the video, and the later one (p2) is filled by the seek events that happened when learners first watched the video. From the event graph, both positions correspond to one peak, which means learners most watched the content at both positions. By examining the video content at position (p1), the instructors of this course figured out that the video content appeared in the assignment as well as in the final exam. Thus, when one selected only the clickstream data before the assignment and the exam as shown in the content view (a), the first peak with re-watched seek events disappeared. To further confirm whether the assignment or the exam led to the phenomenon, the instructors selected the assignment release day and the exam day separately and confirmed that this pattern was triggered by the assignment based on the content view (b). This may mean that seek events regarding a same portion of the video can be triggered by different reasons, at different times. For example, seek events in (a) the clickstream data from the first week when the video is released, may be triggered by students' curiosity; while seek events in (b) the clickstream data from the week when the related assignment released, may be triggered by students' concern about the released assignment.

In one example, the overall statistics of each of the courses CH and GT can give an overview of the course. Both course instructors and educational analysts are greatly interested in the statistics as they are quite easy to understand. Taking the demographic view as an example, an instructor may want to see how learners from different countries react to the same topics. Thus, one video in the Course CH is selected for filtering the clickstream data by the demographic information to be shown in FIG. 19.

Figure 19:
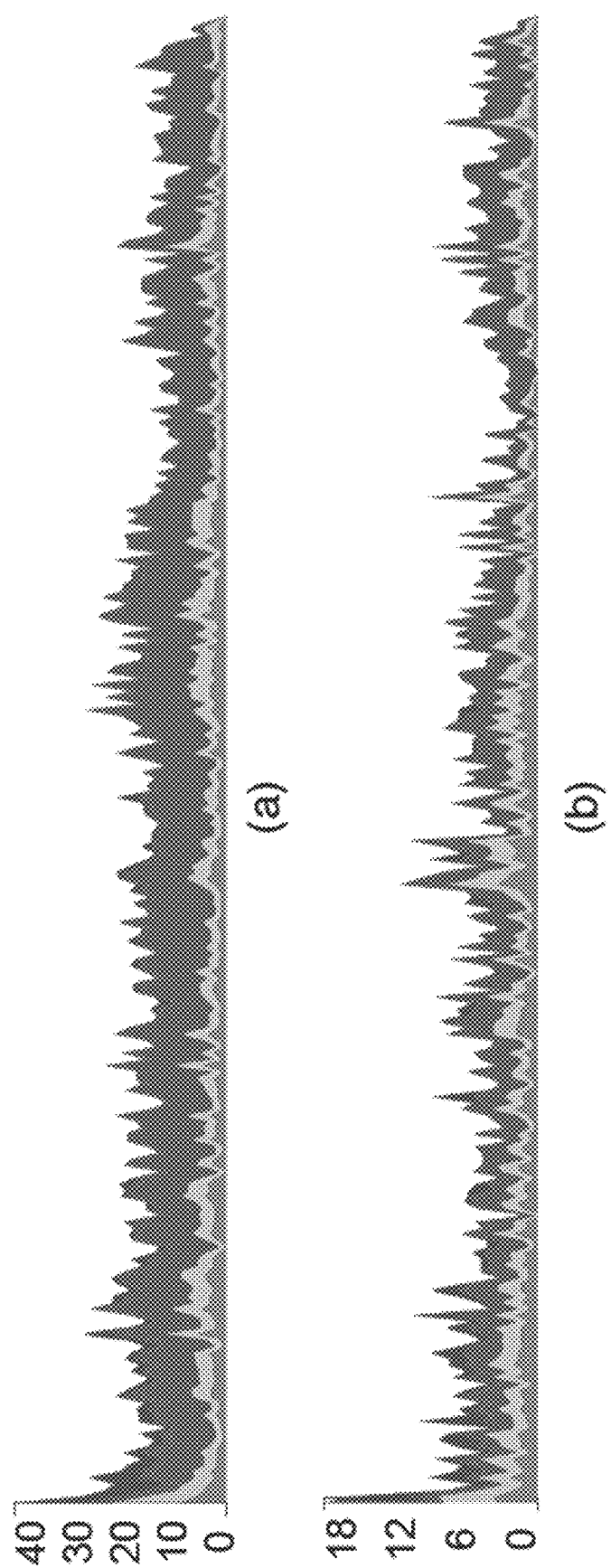
FIG. 19 illustrates event graphs showing the clickstream data of the same online video course during the same time period but for learners from different countries, according to an embodiment of the present teaching.

FIG. 19 illustrates event graphs showing the clickstream data of the same online video course during the same time period but for learners from different countries, according to an embodiment of the present teaching. The event graphs in FIG. 19 show the clickstream data of the same course during the same time period but for learners from different countries. (a) Learners from US; (b) Learners from China. From the event graphs, one can clearly see that the percentage of seek events happened in the US is much larger than that happened in China. This was not a single case after people explored more videos and found that the clickstream data of all the videos followed the same pattern. In order to further validate if there is a significant difference between individuals from these two countries, statistical information about the clickstream distribution on US and China are analyzed with a result that confirmed this finding. Based on instructors' own experience in face-to-face education, one possible reason for this finding may be that, more Chinese students prefer taking notes. Thus, when watching MOOC videos, Chinese learners may prefer to pause the video, take notes, and then play it again. This can explain the lower percentage of seek events for Chinese learners.

Figure 20:
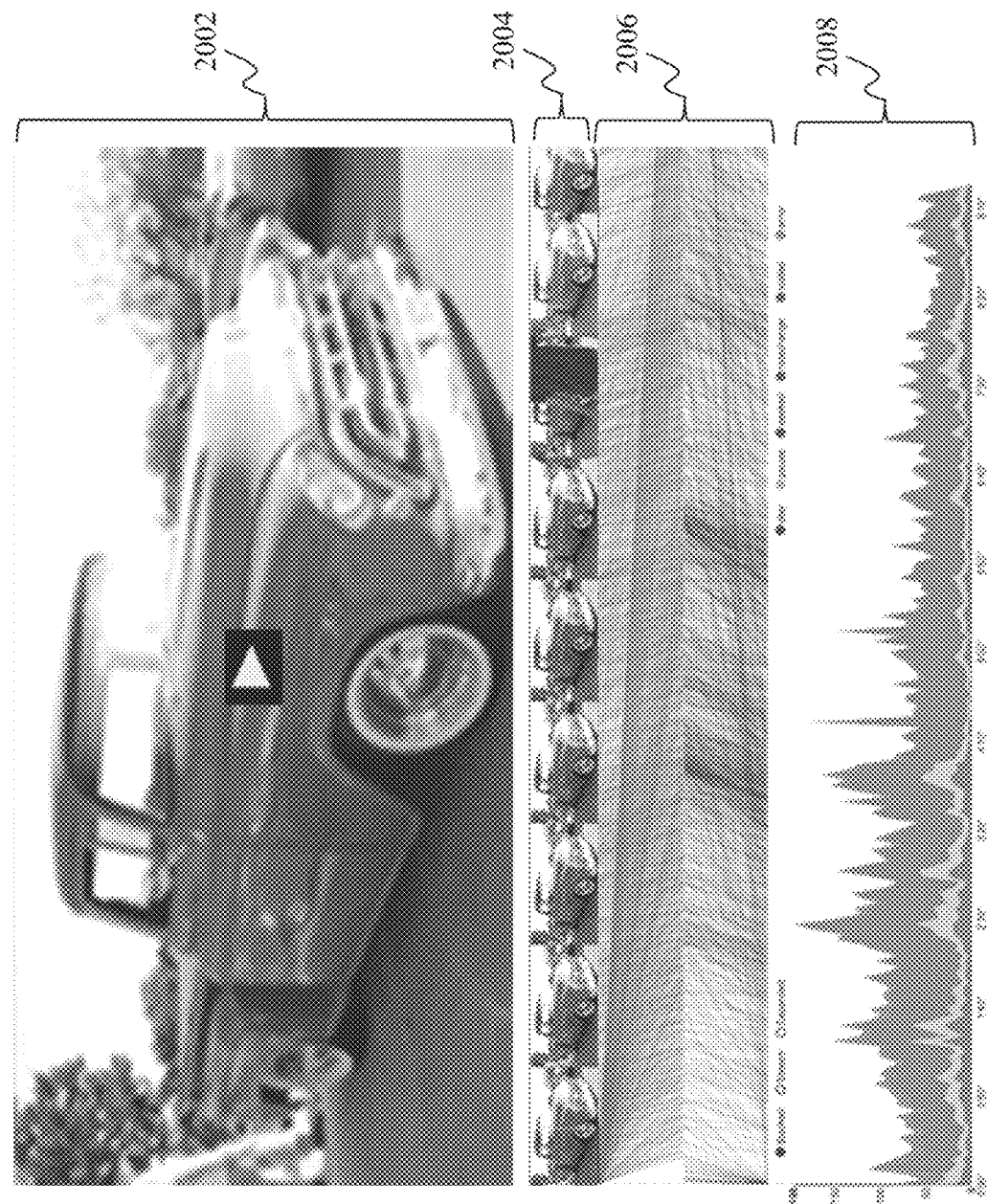
FIG. 20 illustrates another exemplary user interface for presenting a result of a video watching activity analysis, according to an embodiment of the present teaching.

FIG. 20 illustrates another exemplary user interface for presenting a result of a video watching activity analysis, according to an embodiment of the present teaching. FIG. 20 shows a content view that includes a video 2002, a list of video segments 2004, a seek graph 2006, and an event graph 2008. In this embodiment, each of the graphs includes different parts each of which corresponds to a different segment of the video along a timeline of the video. When a user clicks on any part in any one of the seek graph 2006 and the event graph 2008, a corresponding segment is the list 2004 is selected and played in the box 2002. In one example, when a user clicks on any part in one of the seek graph 2006 and the event graph 2008, a corresponding part of the other graph may be selected and/or highlighted.

In another embodiment, instead of asking the user to choose different portions of the video for analysis. The system can directly provide intuitive data analysis results to the users, e.g. the instructors of an online course. For example, the system may generate a ranked list of different portions of the video based on their respective level of importance. The higher a video portion is ranked in the list, the more attention should be paid by the instructor to the video portion based on the analysis result. The system may send the intuitive data analysis results as a document to the user, e.g. in form of slides, spreadsheet, Word document, PDF document, etc.

Figure 21:
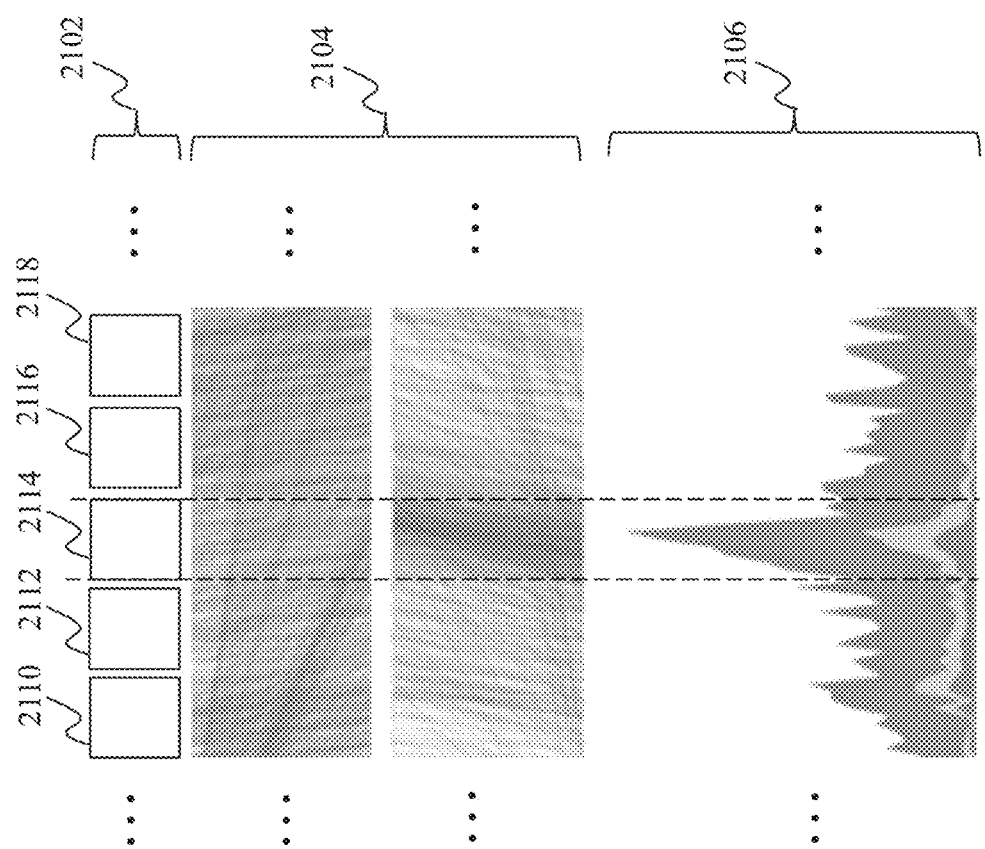
FIG. 21 illustrates a portion of an exemplary user interface for presenting a result of a video watching activity analysis, according to an embodiment of the present teaching.

FIG. 21 illustrates a portion of an exemplary user interface for presenting a result of a video watching activity analysis, according to an embodiment of the present teaching. As shown in FIG. 21, a part in the seek graph 2104 with dense backward seek events corresponds to a peak in the event graph 2106 and a video segment 2114 in the segment list 2102. This may indicate that, compared to neighbor segments 2110, 2112, 2116, 2118, the segment 2114 includes content that is of particular importance to the viewers. This may be because the segment 2114 includes content that is worthwhile for the viewers to watch again for learning or memorizing. This may also be because the segment 2114 includes content that attracts more attention from viewers compared to the neighbor segments, e.g. when the segment 2114 includes an assignment of the video lecture or content related to an exam. The system may include all of the above mentioned explanations in a report to the user or instructor. The report may also include some corresponding recommendations to the user, like deleting a portion, simplifying a portion, expanding a portion with more details, changing a position of a portion, etc. Then the user may choose from different options, based on the recommendations, to modify one or more portions in the video.

Figure 22:
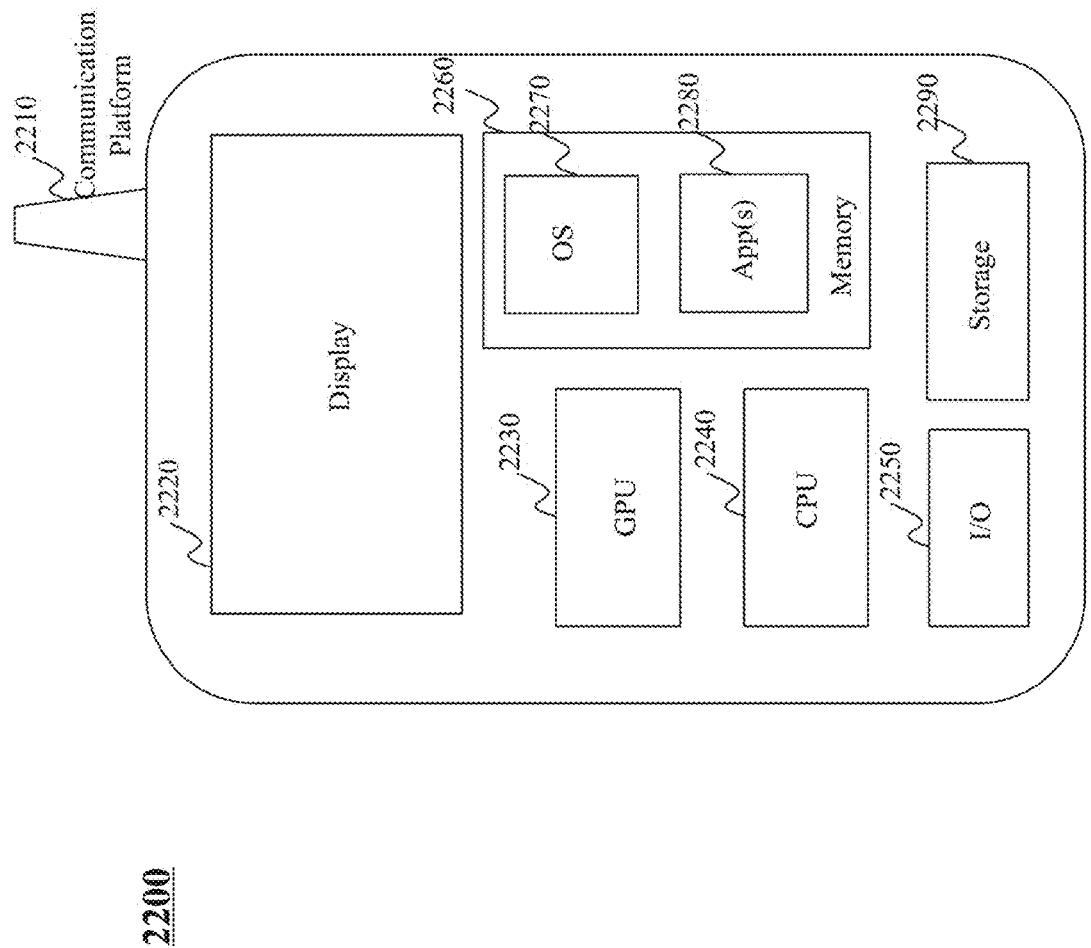
FIG. 22 depicts the architecture of a mobile device which can be used to implement a specialized system incorporating the present teaching.

FIG. 22 depicts the architecture of a mobile device which can be used to realize a specialized system implementing the present teaching. In this example, the user device on which a video is presented and interacted-with is a mobile device 2200, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 2200 in this example includes one or more central processing units (CPUs) 2240, one or more graphic processing units (GPUs) 2230, a display 2220, a memory 2260, a communication platform 2210, such as a wireless communication module, storage 2290, and one or more input/output (I/O) devices 2250. Any other suitable component, including but not limited to a system bus or a controller (not shown), may also be included in the mobile device 2200. As shown in FIG. 22, a mobile operating system 2270, e.g., iOS, Android, Windows Phone, etc., and one or more applications 2280 may be loaded into the memory 2260 from the storage 2290 in order to be executed by the CPU 2240. The applications 2280 may include a browser or any other suitable mobile apps for receiving and playing video on the mobile device 2200. User interactions with the video may be achieved via the I/O devices 2250 and provided to the video watching activity analysis system 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the video watching activity analysis system 140, the publisher 130 and/or other components of systems 100 and 200 described with respect to FIGS. 1-21). The hardware elements, operating systems and programming languages of such computers are conventional in nature, and it is presumed that those skilled in the art are adequately familiar therewith to adapt those technologies about analyzing user activities related to a video as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 23:
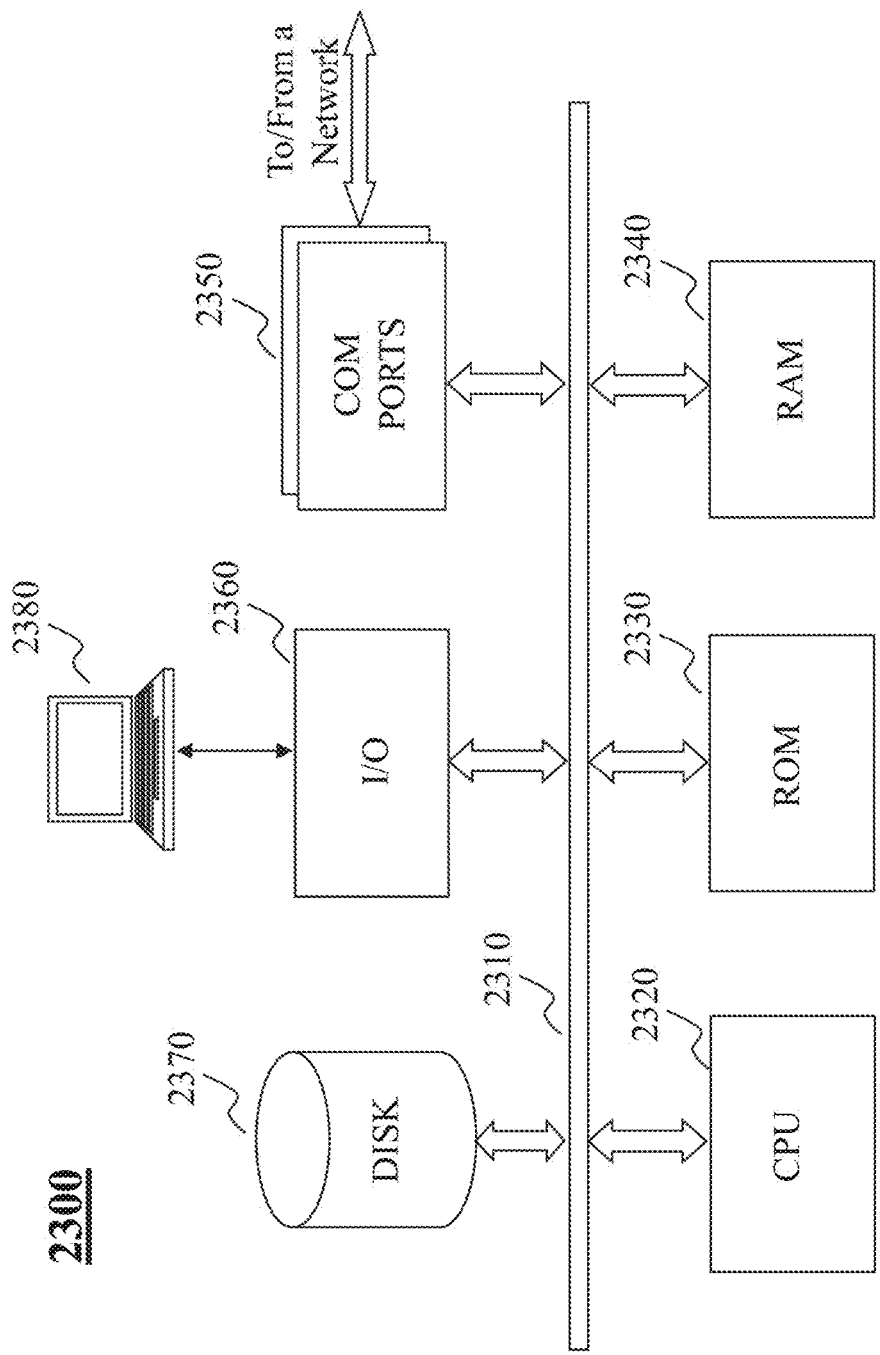
FIG. 23 depicts the architecture of a computer which can be used to implement a specialized system incorporating the present teaching.

FIG. 23 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2300 may be used to implement any component of the techniques of analyzing user activities related to a video, as described herein. For example, the publisher 130, the video watching activity analysis system 140, etc., may be implemented on a computer such as computer 2300, via its hardware, software program, firmware, or a combination thereof. Although only one such computer is shown, for convenience, the computer functions relating to analyzing user activities related to a video as described herein may be implemented in a distributed fashion on a number of similar platforms, to distribute the processing load.

The computer 2300, for example, includes COM ports 2350 connected to and from a network connected thereto to facilitate data communications. The computer 2300 also includes a central processing unit (CPU) 2320, in the form of one or more processors, for executing program instructions. The exemplary computer platform includes an internal communication bus 2310, program storage and data storage of different forms, e.g., disk 2370, read only memory (ROM) 2330, or random access memory (RAM) 2340, for various data files to be processed and/or communicated by the computer, as well as possibly program instructions to be executed by the CPU. The computer 2300 also includes an I/O component 2360, supporting input/output flows between the computer and other components therein such as user interface elements 2380. The computer 2300 may also receive programming and data via network communications.

Hence, aspects of the methods of analyzing user activities related to a video, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with analyzing user activities related to a video. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, analyzing user activities related to a video as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for analyzing user activities, comprising:
   providing, via a video generator, a video to a plurality of users;
   receiving, via a video watching activity monitor, user activity data related to one or more types of user activities performed in time with respect to different portions of the video by the plurality of users;
   generating, via an invalid data remover, seek event data from the user activity data, wherein the seek event data relates to seek activities whereby a user switches from a first position of the video to a second position of the video;
   generating, via an activity-based graph generator and based on the seek event data, one or more visual representations of the one or more types of user activities, wherein the one or more visual representations comprise at least one seek graph that visually represents the seek activities with respect to a timeline of the video; and
   determining, via a user interest analyzer, collective interests of a group of users from the plurality of users with respect to the different portions of the video based on the at least one seek graph, wherein one or more of the portions of the video are to be modified based on the collective interests.

2. The method of claim 1, wherein the one or more visual representations indicate:
   a level of attention associated with the plurality of users for the different portions of the video at any time instance; and
   a distribution of the plurality of users that performed at least one user activity of the one or more user activities with respect to each of the different portions of the video.

3. The method of claim 1, further comprising:
   determining, via a video content analyzer and based on the one or more visual representations, which of the different portions of the video is of particular importance, wherein the video is to be further modified based on the different portions that are determined to be of particular importance.

4. The method of claim 1, wherein the one or more types of user activities include at least one of:
   playing the video;
   pausing the video;
   seeking to a portion of the video;
   stalling the video;
   changing a rate for playing the video; and
   obtaining an error of the video.

5. The method of claim 1, further comprising:
   receiving, via a video watching activity data filter, a request for analyzing user activities;
   retrieving, via the video watching activity data filter, user profiles of the plurality of users;
   determining, via the video watching activity data filter, the group of users based on the request and the user profiles of the plurality of users; and
   providing, via a presentation arrangement determiner, the collective interests of the group of users with respect to the different portions of the video as a response to the request.

6. The method of claim 1, wherein the seek activities correspond to the user switching from the first position to the second position, wherein the first position corresponds to a first time in the video and the second position corresponds to a second time in the video, generating the seek event data comprises:
   removing, from the user activity data and via a metadata extractor, invalid data for each of the one or more types of user activities;
   extracting, via the metadata extractor, metadata from the seek event data;
   determining, via the metadata extractor, the first position and an event time associated with each seek event based on the metadata; and
   generating, via an event graph generator, at least one event graph that indicates a quantity of users of the plurality of users performing each of the one or more types of user activities with respect to each of the different portions of the video.

7. The method of claim 1, wherein generating the seek event data comprises:
   removing, from the user activity data and via the invalid data remover, invalid data related to the seek activities to generate clean data of the seek activities, wherein the seek activities correspond to the user switching from the first position to the second position, wherein the first position corresponds to a first time in the video and the second position corresponds to a second time in the video;
   extracting, via a metadata extractor, metadata from the seek event data of the seek activities, the metadata indicating the first position related to a temporally prior seek event;

generating, via the metadata extractor, formatted seek event data related to activities performed by the plurality of users during the video based on the metadata; and causing, via the metadata extractor, the seek activities to be temporally aligned with the video using the formatted seek event data and the metadata to generate the at least one seek graph.

8. The method of claim 1, wherein the at least one seek graph comprises:
two parallel axes to encode a starting position and an ending position of each seek activity; and
a plurality of straight lines each of which is between the two parallel axes to connect the starting position and the ending position together for each seek activity.

9. The method of claim 1, wherein the at least one seek graph comprises:
a forward graph that includes:
first two parallel axes to encode a first starting position and a first ending position of each forward seek activity where the first ending position is temporally after the first starting position with respect to the timeline of the video, and
a first plurality of straight lines each of which is between the first two parallel axes to connect the first starting position and the first ending position of each forward seek activity; and
a backward graph that includes:
second two parallel axes to encode a second starting position and a second ending position of each backward seek activity where the second ending position is temporally before the second starting position with respect to the timeline of the video, and
a second plurality of straight lines each of which is between the second two parallel axes to connect the second starting position and the second ending position of each backward seek activity.

10. The method of claim 1, wherein:
each of the one or more visual representations includes different parts, each of the different parts corresponding to a different portion of the video with respect to the timeline of the video; and
when a user clicks on a part of the different parts, a corresponding portion of the video is activated to be played.

11. The method of claim 1, further comprising:
generating, via a video content analyzer, a ranked list of video portions from the video based on the one or more visual representations indicating a level of importance associated with each video portion included within the ranked list, wherein the ranked list corresponds to one or more video portions that received greater seek activity than other portions of the video; and
providing, via a presentation arrangement determiner, the ranked list of video portions, the one or more visual representations, and the collective interests to an instructor for modifying the one or more portions of the video.

12. A system having at least one processor, storage, and a communication platform capable of connecting to a network for analyzing user activities, comprising:
a video generator configured to provide a video to a plurality of users;
a video watching activity monitor configured to receive user activity data related to one or more types of user activities performed in time with respect to different portions of the video by the plurality of users;
an invalid data remover configured to generate seek event data from the user activity data, wherein the seek event data relates to seek activities whereby a user switches from a first position of the video to a second position of the video;
an activity-based graph generator configured to generate, based on the seek event data, one or more visual representations of the one or more types of user activities, wherein the one or more visual representations comprise at least one seek graph that visually represents the seek activities with respect to a timeline of the video; and
a user interest analyzer configured to determine collective interests of a group of users from the plurality of users with respect to the different portions of the video based on the at least one seek graph, wherein one or more portions of the video are to be modified based on the collective interests.

13. The system of claim 12, wherein the one or more visual representations indicate:
a level of attention associated with the plurality of users for the different portions of the video at any time instance; and
a distribution of the plurality of users that performed at least one user activity of the one or more user activities with respect to each of the different portions of the video.

14. The system of claim 12, further comprising:
a video content analyzer configured to determine, based on the one or more visual representations, which of the different portions of the video is of particular importance, wherein the video is to be further modified based on the different portions that are determined to be of particular importance.

15. The system of claim 12, wherein the one or more types of user activities include at least one of:
playing the video;
pausing the video;
seeking to a portion of the video;
stalling the video;
changing a rate for playing the video; and
obtaining an error of the video.

16. The system of claim 12, further comprising:
a video watching activity data filter configured to:
receive a request for analyzing user activities;
retrieve user profiles of the plurality of users; and
determine the group of users based on the request and the user profiles of the plurality of users; and
a presentation arrangement determiner configured to provide the collective interests of the group of users with respect to the different portions of the video as a response to the request.

17. The system of claim 12, wherein the seek activities correspond to one of the one or more types of user activities the user switching from the first position to the second position, wherein the first position corresponds to a first time in the video and the second position corresponds to a second time in the video, and the invalid data remover comprises:
a metadata extractor configured to:
remove, from the user activity data, invalid data for each of the one or more types of user activities to generate clean data of the one or more types of user activities;
extract metadata from the seek event data; and
determine the first position and an event time associated with each seek event based on the metadata; and an event graph generator configured to generate at least one event graph that indicates a quantity of users of the plurality of users performing each of the one or more types of user activities with respect to each of the different portions of the video.

18. The system of claim 12, wherein the invalid data remover is further configured to:
remove, from the user activity data, invalid data related to seek activities to generate clean data of the seek activities, wherein the seek activities correspond to the user switching from the first position to the second position, wherein the first position corresponds to a first time in the video and the second position corresponds to a second time in the video, the invalid data remover further comprising:
a metadata extractor configured to:
extract metadata from the seek event data of the seek activities, the metadata indicating the first position related to a temporally prior seek event;
generate formatted seek event data related to activities performed by the plurality of users during the video based on the metadata; and
cause the seek activities to be temporally aligned with the video using the formatted seek event data and the metadata to be used to generate the at least one seek graph.

19. The system of claim 12, wherein the at least one seek graph comprises:
two parallel axes to encode a starting position and an ending position of each seek activity; and
a plurality of straight lines each of which is between the two parallel axes to connect the starting position and the ending position together for each seek activity.

20. The system of claim 12, wherein the at least one seek graph comprises:
a forward graph that includes:
first two parallel axes to encode a first starting position and a first ending position of each forward seek activity where the first ending position is temporally after the first starting position with respect to the timeline of the video, and
a first plurality of straight lines each of which is between the first two parallel axes to connect the first starting position and the first ending position of each forward seek activity; and
a backward graph that includes:
second two parallel axes to encode a second starting position and a second ending position of each backward seek activity where the second ending position is temporally before the second starting position with respect to the timeline of the video, and
a second plurality of straight lines each of which is between the second two parallel axes to connect the second starting position and the second ending position of each backward seek activity.

21. The system of claim 12, wherein:
each of the one or more visual representations includes different parts each of the different parts corresponding to a different portion of the video with respect to the timeline of the video; and
when a user clicks on a part of the different parts, a corresponding portion of the video is activated to be played.

22. A non-transitory machine readable medium having information recorded thereon for analyzing user activities, wherein the information, when read by a machine, causes the machine to perform the following:

providing, via a video generator, a video to a plurality of users;
receiving, via a video watching activity monitor, user activity data related to one or more types of user activities performed in time with respect to different portions of the video by the plurality of users;
generating, via an invalid data remover, seek event data by removing from the user activity data, wherein the seek event data relates to seek activities whereby a user switches from a first position of the video to a second position of the video;
generating, via an activity-based graph generator and based on the seek event data, one or more visual representations of the one or more types of user activities, wherein the one or more visual representations comprise at least one seek graph that visually represent the seek activities related to the plurality of users with respect to a timeline of the video; and
determining, via a user interest analyzer, collective interests of a group of users from the plurality of users with respect to the different portions of the video based on the at least one seek graph, wherein one or more portions of the video are to be modified based on the collective interests.

23. The medium of claim 22, wherein the one or more visual representations indicate:
a level of attention associated with the plurality of users for the different portions of the video at any time instance; and
a distribution of the plurality of users that performed at least one user activity of the one or more user activities with respect to each of the different portions of the video.

24. The medium of claim 22, wherein the information, when read by the machine, further causes the machine to perform the following:
determining, via a video content analyzer and based on the one or more visual representations, which of the different portions of the video is of particular importance, wherein the video is to be further modified based on the different portions that are determined to be of particular importance.

25. The medium of claim 22, wherein the one or more types of user activities include at least one of:
playing the video;
pausing the video;
seeking to a portion of the video;
stalling the video;
changing a rate for playing the video; and
obtaining an error of the video.

26. The medium of claim 22, wherein the information, when read by the machine, further causes the machine to perform the following:
receiving, via a video watching activity data filter, a request for analyzing user activities;
retrieving, via the video watching activity data filter, user profiles of the plurality of users;
determining, via the video watching activity data filter, the group of users based on the request and the user profiles of the plurality of users; and
providing, via a presentation arrangement determiner, the collective interests of the group of users with respect to the different portions of the video as a response to the request.

27. The medium of claim 22, wherein the seek activities correspond to the user switching from the first position to the second position, wherein the first position corresponds to a first time in the video and the second position corresponds to a second time in the video, and wherein the information comprising generating the seek event data, when read by the machine, further causes the machine to perform the following:

removing, from the user activity data and via a metadata extractor, invalid data for each of the one or more types of user activities, wherein the seek activities correspond to one of the one or more types of user activities;

extracting, via the metadata extractor, metadata from the seek event data;

determining, via the metadata extractor, the first position and an event time associated with each seek event based on the metadata; and generating, via an event graph generator, at least one event graph that indicates a quantity of users of the plurality of users performing each of the one or more types of user activities with respect to each of the different portions of the video.

28. The medium of claim 22, wherein the information comprising generating the seek event data, when read by the machine, further causes the machine to perform the following:

removing, from the user activity data and via the invalid data remover, invalid data related to the seek activities, wherein the seek activities correspond to the user switching from the first position to the second position, wherein the first position corresponds to a first time in the video and the second position corresponds to a second time in the video;

extracting, via a metadata extractor, metadata from the seek event data of the seek activities, the metadata indicating the first position related to a temporally prior seek event;

generating, via the metadata extractor, formatted seek event data related to activities performed by the plurality of users during the video based on the metadata; and causing, via the metadata extractor, the seek activities to be temporally aligned with the video using the formatted seek event data and the metadata to generate the at least one seek graph.

29. The medium of claim 22, wherein the at least one seek graph comprises:

two parallel axes to encode a starting position and an ending position of each seek activity; and a plurality of straight lines each of which is between the two parallel axes to connect the starting position and the ending position together for each seek activity.

30. The medium of claim 22, wherein the at least one seek graph comprises:

a forward graph that includes:

first two parallel axes to encode a first starting position and a first ending position of each forward seek activity where the first ending position is temporally after the first starting position with respect to the timeline of the video, and a first plurality of straight lines each of which is between the first two parallel axes to connect the first starting position and the first ending position of each forward seek activity; and a backward graph that includes:

second two parallel axes to encode a second starting position and a second ending position of each backward seek activity where the second ending position is temporally before the second starting position with respect to the timeline of the video, and a second plurality of straight lines each of which is between the second two parallel axes to connect the second starting position and the second ending position of each backward seek activity.

31. The medium of claim 22, wherein:

each of the one or more visual representations includes different parts, each of the different parts corresponding to a different portion of the video with respect to the timeline of the video; and when a user clicks on a part of the different parts, a corresponding portion of the video is activated to be played.

\* \* \* \* \*